US012748839B2

(12) United States Patent
Lee et al.

(10) Patent No.: US 12,748,839 B2
(45) Date of Patent: Sep. 29, 2026

(54) APPARATUSES AND METHODS FOR DIRECT REFRESH MANAGEMENT ATTACK IDENTIFICATION

(71) Applicant: Micron Technology, Inc., Boise, ID (US)

(72) Inventors: Yunyoung Lee, Meridian, ID (US); Yuan He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 80 days.

(21) Appl. No.: 18/746,551

(22) Filed: Jun. 18, 2024

(65) Prior Publication Data

US 2025/0111045 A1 Apr. 3, 2025

Related U.S. Application Data

(60) Provisional application No. 63/586,538, filed on Sep. 29, 2023.

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ...................... G11C 11/4076; G11C 11/40611
See application file for complete search history.

(56) References Cited

U.S. PATENT DOCUMENTS 5,225,839 A 7/1993 Okurowski et al.
5,299,159 A 3/1994 Balistreri et al.
5,654,929 A 8/1997 Mote
5,699,297 A 12/1997 Yamazaki et al.
5,867,442 A 2/1999 Kim et al.
5,933,377 A 8/1999 Hidaka
5,943,283 A 8/1999 Wong et al.
5,956,288 A 9/1999 Bermingham et al.
5,959,923 A 9/1999 Matteson et al.
5,970,507 A 10/1999 Kato et al.
5,999,471 A 12/1999 Choi
(Continued)

FOREIGN PATENT DOCUMENTS

BE 825677 A 8/1975
CN 1841551 A 10/2006
(Continued)

OTHER PUBLICATIONS

Anonymous: "Frequency—Wikipedia", Dec. 17, 2018, retrieved from URL: https://en.wikipedia.org/w/index.php?title=Frequency&oldid=874192848.
(Continued)

*Primary Examiner* — Amir Zarabian
*Assistant Examiner* — Anthony Thinh Tang
(74) *Attorney, Agent, or Firm* — Dorsey & Whitney LLP

(57) ABSTRACT

Memory devices direct refresh management (DRFM) attack identification. A DRFM logic circuit receives DRFM aggressor address and compares it to a previous DRFM aggressor address. If there is not a match, then a DRFM operation is performed. If there is a match, then the DRFM operation may be skipped. This may prevent repeated DRFM operations from being performed on a same DRFM aggressor address.

20 Claims, 7 Drawing Sheets

(56) References Cited

U.S. PATENT DOCUMENTS

| | | | |
|---|---|---|---|
| 5,999,473 | A | 12/1999 | Harrington et al. |
| 6,002,629 | A | 12/1999 | Kim et al. |
| 6,011,734 | A | 1/2000 | Pappert |
| 6,061,290 | A | 5/2000 | Shirley |
| 6,064,621 | A | 5/2000 | Tanizaki et al. |
| 6,212,118 | B1 | 4/2001 | Fujita |
| 6,298,413 | B1 | 10/2001 | Christenson |
| 6,306,721 | B1 | 10/2001 | Teo et al. |
| 6,310,806 | B1 | 10/2001 | Higashi et al. |
| 6,310,814 | B1 | 10/2001 | Hampel et al. |
| 6,363,024 | B1 | 3/2002 | Fibranz |
| 6,392,952 | B1 | 5/2002 | Chen et al. |
| 6,424,582 | B1 | 7/2002 | Ooishi |
| 6,434,064 | B2 | 8/2002 | Nagai |
| 6,452,868 | B1 | 9/2002 | Fister |
| 6,490,216 | B1 | 12/2002 | Chen et al. |
| 6,515,928 | B2 | 2/2003 | Sato et al. |
| 6,535,950 | B1 | 3/2003 | Funyu et al. |
| 6,535,980 | B1 | 3/2003 | Kumar et al. |
| 6,563,757 | B2 | 5/2003 | Agata |
| 6,567,340 | B1 | 5/2003 | Nataraj et al. |
| 6,950,364 | B2 | 9/2005 | Kim |
| 6,977,824 | B1 | 12/2005 | Yang et al. |
| 7,002,868 | B2 | 2/2006 | Takahashi |
| 7,057,960 | B1 | 6/2006 | Fiscus et al. |
| 7,061,225 | B2 | 6/2006 | Yang et al. |
| 7,061,780 | B2 | 6/2006 | Yang et al. |
| 7,082,070 | B2 | 7/2006 | Hong |
| 7,187,607 | B2 | 3/2007 | Koshikawa et al. |
| 7,203,113 | B2 | 4/2007 | Takahashi et al. |
| 7,203,115 | B2 | 4/2007 | Eto et al. |
| 7,209,402 | B2 | 4/2007 | Shinozaki et al. |
| 7,215,588 | B2 | 5/2007 | Lee |
| 7,444,577 | B2 | 10/2008 | Best et al. |
| 7,551,502 | B2 | 6/2009 | Dono et al. |
| 7,565,479 | B2 | 7/2009 | Best et al. |
| 7,692,993 | B2 | 4/2010 | Tida et al. |
| 7,830,742 | B2 | 11/2010 | Han |
| 8,174,921 | B2 | 5/2012 | Kim et al. |
| 8,400,805 | B2 | 3/2013 | Yoko |
| 8,526,260 | B2 | 9/2013 | Pyeon |
| 8,572,423 | B1 | 10/2013 | Isachar et al. |
| 8,625,360 | B2 | 1/2014 | Iwamoto et al. |
| 8,681,578 | B2 | 3/2014 | Narui |
| 8,756,368 | B2 | 6/2014 | Best et al. |
| 8,811,100 | B2 | 8/2014 | Ku |
| 8,862,973 | B2 | 10/2014 | Zimmerman et al. |
| 8,938,573 | B2 | 1/2015 | Greenfield et al. |
| 9,032,141 | B2 | 5/2015 | Bains et al. |
| 9,047,978 | B2 | 6/2015 | Bell et al. |
| 9,076,499 | B2 | 7/2015 | Schoenborn et al. |
| 9,076,548 | B1 | 7/2015 | Park et al. |
| 9,087,602 | B2 | 7/2015 | Youn et al. |
| 9,117,544 | B2 | 8/2015 | Bains et al. |
| 9,123,447 | B2 | 9/2015 | Lee et al. |
| 9,153,294 | B2 | 10/2015 | Kang |
| 9,190,137 | B2 | 11/2015 | Kim et al. |
| 9,190,139 | B2 | 11/2015 | Jung et al. |
| 9,236,110 | B2 | 1/2016 | Bains et al. |
| 9,251,885 | B2 | 2/2016 | Greenfield et al. |
| 9,286,964 | B2 | 3/2016 | Halbert et al. |
| 9,299,400 | B2 | 3/2016 | Bains et al. |
| 9,311,984 | B1 | 4/2016 | Hong et al. |
| 9,311,985 | B2 | 4/2016 | Lee et al. |
| 9,324,398 | B2 | 4/2016 | Jones et al. |
| 9,384,821 | B2 | 7/2016 | Bains et al. |
| 9,390,782 | B2 | 7/2016 | Best et al. |
| 9,396,786 | B2 | 7/2016 | Yoon et al. |
| 9,406,358 | B1 | 8/2016 | Lee |
| 9,412,432 | B2 | 8/2016 | Narui et al. |
| 9,418,723 | B2 | 8/2016 | Chishti et al. |
| 9,424,907 | B2 | 8/2016 | Fujishiro |
| 9,478,316 | B1 | 10/2016 | Ryu |
| 9,484,079 | B2 | 11/2016 | Lee |
| 9,514,850 | B2 | 12/2016 | Kim |
| 9,570,143 | B2 | 2/2017 | Lim et al. |
| 9,570,201 | B2 | 2/2017 | Morgan et al. |
| 9,640,242 | B1 | 5/2017 | Lo et al. |
| 9,646,672 | B1 | 5/2017 | Kim et al. |
| 9,653,139 | B1 | 5/2017 | Park |
| 9,672,889 | B2 | 6/2017 | Lee et al. |
| 9,685,240 | B1 | 6/2017 | Park |
| 9,691,466 | B1 | 6/2017 | Kim |
| 9,697,913 | B1 | 7/2017 | Mariani et al. |
| 9,734,887 | B1 | 8/2017 | Tavva |
| 9,741,409 | B2 | 8/2017 | Jones et al. |
| 9,741,421 | B1 | 8/2017 | Hedden |
| 9,741,447 | B2 | 8/2017 | Akamatsu |
| 9,747,971 | B2 | 8/2017 | Bains et al. |
| 9,761,297 | B1 | 9/2017 | Tomishima |
| 9,786,351 | B2 | 10/2017 | Lee et al. |
| 9,799,391 | B1 | 10/2017 | Wei |
| 9,805,782 | B1 | 10/2017 | Liou |
| 9,805,783 | B2 | 10/2017 | Ito et al. |
| 9,812,185 | B2 | 11/2017 | Fisch et al. |
| 9,818,469 | B1 | 11/2017 | Kim et al. |
| 9,831,003 | B2 | 11/2017 | Sohn et al. |
| 9,865,326 | B2 | 1/2018 | Bains et al. |
| 9,865,328 | B1 | 1/2018 | Desimone et al. |
| 9,892,779 | B2 | 2/2018 | Kang et al. |
| 9,922,694 | B2 | 3/2018 | Akamatsu |
| 9,928,896 | B1 | 3/2018 | Kim et al. |
| 9,934,143 | B2 | 4/2018 | Bains et al. |
| 9,953,696 | B2 | 4/2018 | Kim |
| 9,972,377 | B2 | 5/2018 | Oh et al. |
| 9,978,430 | B2 | 5/2018 | Seo et al. |
| 10,003,328 | B1 | 6/2018 | Yin et al. |
| 10,020,045 | B2 | 7/2018 | Riho |
| 10,020,046 | B1 | 7/2018 | Uemura |
| 10,032,501 | B2 | 7/2018 | Ito et al. |
| 10,049,716 | B2 | 8/2018 | Proebsting |
| 10,083,737 | B2 | 9/2018 | Bains et al. |
| 10,090,038 | B2 | 10/2018 | Shin |
| 10,134,461 | B2 | 11/2018 | Bell et al. |
| 10,141,042 | B1 | 11/2018 | Richter |
| 10,147,472 | B2 | 12/2018 | Jones et al. |
| 10,153,031 | B2 | 12/2018 | Akamatsu |
| 10,170,174 | B1 | 1/2019 | Ito et al. |
| 10,192,608 | B2 | 1/2019 | Morgan |
| 10,210,925 | B2 | 2/2019 | Bains et al. |
| 10,297,305 | B1 | 5/2019 | Moon et al. |
| 10,297,307 | B1 | 5/2019 | Raad et al. |
| 10,339,994 | B2 | 7/2019 | Ito et al. |
| 10,381,327 | B2 | 8/2019 | Ramachandra et al. |
| 10,418,978 | B1 | 9/2019 | Au Yeung et al. |
| 10,446,256 | B2 | 10/2019 | Ong et al. |
| 10,468,076 | B1 | 11/2019 | He et al. |
| 10,490,250 | B1 | 11/2019 | Ito et al. |
| 10,490,251 | B2 | 11/2019 | Wolff |
| 10,504,577 | B1 | 12/2019 | Alzheimer |
| 10,510,396 | B1 | 12/2019 | Notani et al. |
| 10,572,377 | B1 | 2/2020 | Zhang et al. |
| 10,573,370 | B2 | 2/2020 | Ito et al. |
| 10,607,679 | B2 | 3/2020 | Nakaoka |
| 10,672,449 | B2 | 6/2020 | Ito et al. |
| 10,685,696 | B2 | 6/2020 | Brown et al. |
| 10,699,796 | B2 | 6/2020 | Benedict et al. |
| 10,790,005 | B1 | 9/2020 | He et al. |
| 10,825,505 | B2 | 11/2020 | Rehmeyer |
| 10,832,792 | B1 | 11/2020 | Penney et al. |
| 10,930,335 | B2 | 2/2021 | Bell et al. |
| 10,943,636 | B1 | 3/2021 | Wu et al. |
| 10,950,289 | B2 | 3/2021 | Ito et al. |
| 10,957,377 | B2 | 3/2021 | Noguchi |
| 10,964,378 | B2 | 3/2021 | Ayyapureddi et al. |
| 10,978,132 | B2 | 4/2021 | Rehmeyer et al. |
| 11,017,833 | B2 | 5/2021 | Wu et al. |
| 11,062,754 | B2 | 7/2021 | Ito et al. |
| 11,069,393 | B2 | 7/2021 | Cowles et al. |
| 11,081,160 | B2 | 8/2021 | Ito et al. |
| 11,222,683 | B2 | 1/2022 | Rehmeyer |
| 11,222,686 | B1 | 1/2022 | Noguchi |
| 11,227,649 | B2 | 1/2022 | Meier et al. |
| 11,264,079 | B1 | 3/2022 | Roberts |

(56) References Cited

U.S. PATENT DOCUMENTS

| | | | |
|---|---|---|---|
| 11,302,374 | B2 | 4/2022 | Jenkinson et al. |
| 11,302,377 | B2 | 4/2022 | Li et al. |
| 11,309,010 | B2 | 4/2022 | Ayyapureddi |
| 11,309,012 | B2 | 4/2022 | Meier et al. |
| 11,315,619 | B2 | 4/2022 | Wolff |
| 11,315,620 | B2 | 4/2022 | Ishikawa et al. |
| 11,320,377 | B2 | 5/2022 | Chen et al. |
| 11,348,631 | B2 | 5/2022 | Wu et al. |
| 11,380,382 | B2 | 7/2022 | Zhang et al. |
| 11,386,946 | B2 | 7/2022 | Ayyapureddi et al. |
| 11,417,383 | B2 | 8/2022 | Jenkinson et al. |
| 11,532,346 | B2 | 12/2022 | Brown et al. |
| 11,557,331 | B2 | 1/2023 | Mitsubori et al. |
| 11,610,622 | B2 | 3/2023 | Rehmeyer et al. |
| 11,615,831 | B2 | 3/2023 | Yamamoto |
| 11,626,152 | B2 | 4/2023 | Wu et al. |
| 11,688,452 | B2 | 6/2023 | Nale et al. |
| 11,715,512 | B2 | 8/2023 | Li et al. |
| 11,749,331 | B2 | 9/2023 | Wu et al. |
| 11,798,610 | B2 | 10/2023 | Cowles et al. |
| 11,810,612 | B2 | 11/2023 | Roberts |
| 11,935,576 | B2 | 3/2024 | Ishikawa et al. |
| 11,955,158 | B2 | 4/2024 | Brown et al. |
| 12,002,501 | B2 | 6/2024 | Noguchi |
| 12,112,787 | B2 | 10/2024 | He et al. |
| 12,125,514 | B2 | 10/2024 | Suzuki |
| 2001/0008498 | A1 | 7/2001 | Ooishi |
| 2002/0026613 | A1 | 2/2002 | Niiro |
| 2002/0181301 | A1 | 12/2002 | Takahashi et al. |
| 2002/0191467 | A1 | 12/2002 | Matsumoto et al. |
| 2003/0026161 | A1 | 2/2003 | Yamaguchi et al. |
| 2003/0063512 | A1 | 4/2003 | Takahashi et al. |
| 2003/0067825 | A1 | 4/2003 | Shimano et al. |
| 2003/0081483 | A1 | 5/2003 | De et al. |
| 2003/0123301 | A1 | 7/2003 | Jang et al. |
| 2003/0161208 | A1 | 8/2003 | Nakashima et al. |
| 2003/0193829 | A1 | 10/2003 | Morgan et al. |
| 2003/0231540 | A1 | 12/2003 | Lazar et al. |
| 2004/0004856 | A1 | 1/2004 | Sakimura et al. |
| 2004/0008544 | A1 | 1/2004 | Shinozaki et al. |
| 2004/0022093 | A1 | 2/2004 | Lee |
| 2004/0024955 | A1 | 2/2004 | Patel |
| 2004/0085835 | A1 | 5/2004 | Ahn et al. |
| 2004/0114446 | A1 | 6/2004 | Takahashi et al. |
| 2004/0130959 | A1 | 7/2004 | Kawaguchi |
| 2004/0160838 | A1 | 8/2004 | Pelley et al. |
| 2004/0184323 | A1 | 9/2004 | Mori et al. |
| 2004/0218431 | A1 | 11/2004 | Chung et al. |
| 2005/0002254 | A1 | 1/2005 | Otsuka et al. |
| 2005/0002268 | A1 | 1/2005 | Otsuka et al. |
| 2005/0041502 | A1 | 2/2005 | Perner |
| 2005/0105362 | A1 | 5/2005 | Choi et al. |
| 2005/0108460 | A1 | 5/2005 | David |
| 2005/0213408 | A1 | 9/2005 | Shieh |
| 2005/0243627 | A1 | 11/2005 | Lee et al. |
| 2005/0249009 | A1 | 11/2005 | Shieh |
| 2005/0265104 | A1 | 12/2005 | Remaklus et al. |
| 2006/0018174 | A1 | 1/2006 | Park et al. |
| 2006/0050591 | A1 | 3/2006 | Park |
| 2006/0083099 | A1 | 4/2006 | Bae et al. |
| 2006/0087903 | A1 | 4/2006 | Riho et al. |
| 2006/0104139 | A1 | 5/2006 | Hur et al. |
| 2006/0176744 | A1 | 8/2006 | Stave |
| 2006/0198220 | A1 | 9/2006 | Yoon et al. |
| 2006/0215474 | A1 | 9/2006 | Hokenmaier |
| 2006/0233012 | A1 | 10/2006 | Sekiguchi et al. |
| 2006/0262616 | A1 | 11/2006 | Chen |
| 2006/0262617 | A1 | 11/2006 | Lee |
| 2006/0268643 | A1 | 11/2006 | Schreck et al. |
| 2007/0002651 | A1 | 1/2007 | Lee |
| 2007/0008799 | A1 | 1/2007 | Dono et al. |
| 2007/0014175 | A1 | 1/2007 | Min et al. |
| 2007/0028068 | A1 | 2/2007 | Golding et al. |
| 2007/0030746 | A1 | 2/2007 | Best et al. |
| 2007/0033338 | A1 | 2/2007 | Tsern |
| 2007/0033339 | A1 | 2/2007 | Best et al. |
| 2007/0058462 | A1 | 3/2007 | Blodgett |
| 2007/0106838 | A1 | 5/2007 | Choi |
| 2007/0147154 | A1 | 6/2007 | Lee |
| 2007/0165042 | A1 | 7/2007 | Yagi |
| 2007/0171750 | A1 | 7/2007 | Oh |
| 2007/0237016 | A1 | 10/2007 | Miyamoto et al. |
| 2007/0263442 | A1 | 11/2007 | Cornwell et al. |
| 2007/0268768 | A1 | 11/2007 | Kawakubo |
| 2007/0297252 | A1 | 12/2007 | Singh |
| 2008/0028137 | A1 | 1/2008 | Schakel et al. |
| 2008/0028260 | A1 | 1/2008 | Oyagi et al. |
| 2008/0031068 | A1 | 2/2008 | Yoo et al. |
| 2008/0126893 | A1 | 5/2008 | Harrand et al. |
| 2008/0130394 | A1 | 6/2008 | Dono et al. |
| 2008/0181048 | A1 | 7/2008 | Han |
| 2008/0212386 | A1 | 9/2008 | Riho |
| 2008/0224742 | A1 | 9/2008 | Pomichter |
| 2008/0253212 | A1 | 10/2008 | Iida et al. |
| 2008/0253213 | A1 | 10/2008 | Sato et al. |
| 2008/0266990 | A1 | 10/2008 | Loeffler |
| 2008/0270683 | A1 | 10/2008 | Barth et al. |
| 2008/0306723 | A1 | 12/2008 | De et al. |
| 2008/0316845 | A1 | 12/2008 | Wang et al. |
| 2009/0021999 | A1 | 1/2009 | Tanimura et al. |
| 2009/0052264 | A1 | 2/2009 | Hong et al. |
| 2009/0059641 | A1 | 3/2009 | Jeddeloh |
| 2009/0073760 | A1 | 3/2009 | Betser et al. |
| 2009/0147606 | A1 | 6/2009 | Daniel |
| 2009/0161468 | A1 | 6/2009 | Fujioka |
| 2009/0168571 | A1 | 7/2009 | Pyo et al. |
| 2009/0185440 | A1 | 7/2009 | Lee |
| 2009/0201752 | A1 | 8/2009 | Riho et al. |
| 2009/0228739 | A1 | 9/2009 | Cohen et al. |
| 2009/0251971 | A1 | 10/2009 | Futatsuyama |
| 2009/0296510 | A1 | 12/2009 | Lee et al. |
| 2010/0005217 | A1 | 1/2010 | Jeddeloh |
| 2010/0005376 | A1 | 1/2010 | Laberge et al. |
| 2010/0061153 | A1 | 3/2010 | Yen et al. |
| 2010/0074042 | A1 | 3/2010 | Fukuda et al. |
| 2010/0097870 | A1 | 4/2010 | Kim et al. |
| 2010/0110809 | A1 | 5/2010 | Kobayashi et al. |
| 2010/0110810 | A1 | 5/2010 | Kobayashi |
| 2010/0124138 | A1 | 5/2010 | Lee et al. |
| 2010/0128547 | A1 | 5/2010 | Kagami |
| 2010/0131812 | A1 | 5/2010 | Mohammad |
| 2010/0141309 | A1 | 6/2010 | Lee |
| 2010/0157693 | A1 | 6/2010 | Iwai et al. |
| 2010/0182862 | A1 | 7/2010 | Teramoto |
| 2010/0182863 | A1 | 7/2010 | Fukiage |
| 2010/0329069 | A1 | 12/2010 | Ito et al. |
| 2011/0007592 | A1 | 1/2011 | Tashiro |
| 2011/0026290 | A1 | 2/2011 | Noda et al. |
| 2011/0055495 | A1 | 3/2011 | Remaklus et al. |
| 2011/0069572 | A1 | 3/2011 | Lee et al. |
| 2011/0122987 | A1 | 5/2011 | Neyer |
| 2011/0134715 | A1 | 6/2011 | Norman |
| 2011/0170353 | A1 | 7/2011 | Nguyen |
| 2011/0216614 | A1 | 9/2011 | Hosoe |
| 2011/0225355 | A1 | 9/2011 | Kajigaya |
| 2011/0299352 | A1 | 12/2011 | Fujishiro et al. |
| 2011/0310648 | A1 | 12/2011 | Iwamoto et al. |
| 2012/0014199 | A1 | 1/2012 | Narui |
| 2012/0059984 | A1 | 3/2012 | Kang et al. |
| 2012/0151131 | A1 | 6/2012 | Kilmer et al. |
| 2012/0155173 | A1 | 6/2012 | Lee et al. |
| 2012/0155206 | A1 | 6/2012 | Kodama et al. |
| 2012/0213021 | A1 | 8/2012 | Riho et al. |
| 2012/0254472 | A1 | 10/2012 | Ware et al. |
| 2012/0287727 | A1 | 11/2012 | Wang |
| 2012/0307582 | A1 | 12/2012 | Marumoto et al. |
| 2012/0327734 | A1 | 12/2012 | Sato |
| 2013/0003467 | A1 | 1/2013 | Klein |
| 2013/0003477 | A1 | 1/2013 | Park et al. |
| 2013/0028034 | A1 | 1/2013 | Fujisawa |
| 2013/0051157 | A1 | 2/2013 | Park |
| 2013/0051171 | A1 | 2/2013 | Porter et al. |
| 2013/0077423 | A1 | 3/2013 | Lee |
| 2013/0173971 | A1 | 7/2013 | Zimmerman |

(56) References Cited

U.S. PATENT DOCUMENTS

2013/0254475 A1 9/2013 Perego et al.
2013/0279284 A1 10/2013 Jeong
2013/0304982 A1 11/2013 Jung et al.
2014/0006700 A1 1/2014 Schaefer et al.
2014/0006703 A1 1/2014 Bains et al.
2014/0006704 A1 1/2014 Greenfield et al.
2014/0013169 A1 1/2014 Kobla et al.
2014/0013185 A1 1/2014 Kobla et al.
2014/0016422 A1 1/2014 Kim et al.
2014/0022858 A1 1/2014 Chen et al.
2014/0043888 A1 2/2014 Chen et al.
2014/0050004 A1 2/2014 Mochida
2014/0078841 A1 3/2014 Chopra
2014/0078842 A1 3/2014 Oh et al.
2014/0089576 A1 3/2014 Bains et al.
2014/0089758 A1 3/2014 Kwok et al.
2014/0095780 A1 4/2014 Bains et al.
2014/0095786 A1 4/2014 Moon et al.
2014/0119091 A1 5/2014 You et al.
2014/0143473 A1 5/2014 Kim et al.
2014/0153315 A1 6/2014 Kwon et al.
2014/0156923 A1 6/2014 Bains et al.
2014/0169114 A1 6/2014 Oh
2014/0177370 A1 6/2014 Halbert et al.
2014/0181453 A1 6/2014 Jayasena et al.
2014/0185403 A1 7/2014 Lai
2014/0189228 A1 7/2014 Greenfield et al.
2014/0219042 A1 8/2014 Yu et al.
2014/0219043 A1 8/2014 Jones et al.
2014/0237307 A1 8/2014 Kobla et al.
2014/0241099 A1 8/2014 Seo et al.
2014/0254298 A1 9/2014 Dally
2014/0281206 A1 9/2014 Crawford et al.
2014/0281207 A1 9/2014 Mandava et al.
2014/0293725 A1 10/2014 Best et al.
2014/0321226 A1 10/2014 Pyeon
2015/0016203 A1 1/2015 Sriramagiri et al.
2015/0036445 A1 2/2015 Yoshida et al.
2015/0049566 A1 2/2015 Lee et al.
2015/0049567 A1 2/2015 Chi
2015/0055420 A1 2/2015 Bell et al.
2015/0078112 A1 3/2015 Huang
2015/0085564 A1 3/2015 Yoon et al.
2015/0089326 A1 3/2015 Joo et al.
2015/0092508 A1 4/2015 Bains
2015/0109871 A1 4/2015 Bains et al.
2015/0120999 A1 4/2015 Kim et al.
2015/0134897 A1 5/2015 Sriramagiri et al.
2015/0155025 A1 6/2015 Lee et al.
2015/0162064 A1 6/2015 Oh et al.
2015/0162067 A1 6/2015 Kim et al.
2015/0170728 A1 6/2015 Jung et al.
2015/0170733 A1 6/2015 Lee et al.
2015/0199126 A1 7/2015 Jayasena et al.
2015/0206572 A1 7/2015 Lim et al.
2015/0213872 A1 7/2015 Mazumder et al.
2015/0243339 A1 8/2015 Bell et al.
2015/0255140 A1 9/2015 Song
2015/0279441 A1 10/2015 Greenberg et al.
2015/0279442 A1 10/2015 Hwang
2015/0294711 A1 10/2015 Gaither et al.
2015/0340077 A1 11/2015 Akamatsu
2015/0356048 A1 12/2015 King
2015/0380073 A1 12/2015 Joo et al.
2016/0019940 A1 1/2016 Jang et al.
2016/0027498 A1 1/2016 Ware et al.
2016/0027531 A1 1/2016 Jones et al.
2016/0027532 A1 1/2016 Kim
2016/0042782 A1 2/2016 Narui et al.
2016/0070483 A1 3/2016 Yoon et al.
2016/0078846 A1 3/2016 Liu et al.
2016/0078911 A1 3/2016 Fujiwara et al.
2016/0085466 A1 3/2016 Benedict et al.
2016/0086649 A1 3/2016 Hong et al.
2016/0093402 A1 3/2016 Kitagawa et al.
2016/0125931 A1 5/2016 Doo et al.
2016/0133314 A1 5/2016 Hwang et al.
2016/0155491 A1 6/2016 Roberts et al.
2016/0180917 A1 6/2016 Chishti et al.
2016/0180921 A1 6/2016 Jeong
2016/0196863 A1 7/2016 Shin et al.
2016/0202926 A1 7/2016 Benedict
2016/0224262 A1 8/2016 Mandava et al.
2016/0225433 A1 8/2016 Bains et al.
2016/0239663 A1 8/2016 Healy et al.
2016/0336060 A1 11/2016 Shin
2016/0343423 A1 11/2016 Shido
2016/0352518 A1 12/2016 Ford et al.
2017/0011792 A1 1/2017 Oh et al.
2017/0047110 A1 2/2017 Kang et al.
2017/0052722 A1 2/2017 Ware et al.
2017/0062038 A1 3/2017 Doo et al.
2017/0076779 A1 3/2017 Bains et al.
2017/0092350 A1 3/2017 Halbert et al.
2017/0110177 A1 4/2017 Lee et al.
2017/0111792 A1 4/2017 Correia Fernandes et al.
2017/0117030 A1 4/2017 Fisch et al.
2017/0133085 A1 5/2017 Kim et al.
2017/0133108 A1 5/2017 Lee et al.
2017/0140807 A1 5/2017 Sun et al.
2017/0140810 A1 5/2017 Choi et al.
2017/0140811 A1 5/2017 Joo
2017/0146598 A1 5/2017 Kim et al.
2017/0148504 A1 5/2017 Saifuddin et al.
2017/0177246 A1 6/2017 Miller et al.
2017/0177505 A1 6/2017 Basak et al.
2017/0186481 A1 6/2017 Oh et al.
2017/0213586 A1 7/2017 Kang et al.
2017/0221546 A1 8/2017 Loh et al.
2017/0263305 A1 9/2017 Cho
2017/0264428 A1 9/2017 Seger, II
2017/0269861 A1 9/2017 Lu et al.
2017/0287547 A1 10/2017 Ito et al.
2017/0323675 A1 11/2017 Jones et al.
2017/0345482 A1 11/2017 Balakrishnan
2017/0352404 A1 12/2017 Lee et al.
2018/0005690 A1 1/2018 Morgan et al.
2018/0025770 A1 1/2018 Ito et al.
2018/0025772 A1 1/2018 Lee et al.
2018/0025773 A1 1/2018 Bains et al.
2018/0033479 A1 2/2018 Lea et al.
2018/0047110 A1 2/2018 Blackman et al.
2018/0061476 A1 3/2018 Kim
2018/0061483 A1 3/2018 Morgan
2018/0061485 A1 3/2018 Joo
2018/0075927 A1 3/2018 Jeong et al.
2018/0082736 A1 3/2018 Jung
2018/0082737 A1 3/2018 Lee
2018/0096719 A1 4/2018 Tomishima et al.
2018/0102776 A1 4/2018 Chandrasekar et al.
2018/0107417 A1 4/2018 Shechter et al.
2018/0108401 A1 4/2018 Choi et al.
2018/0114561 A1 4/2018 Fisch et al.
2018/0114565 A1 4/2018 Lee
2018/0122454 A1 5/2018 Lee et al.
2018/0130506 A1 5/2018 Kang et al.
2018/0137005 A1 5/2018 Wu et al.
2018/0158504 A1 6/2018 Akamatsu
2018/0158507 A1 6/2018 Bang
2018/0182445 A1 6/2018 Lee et al.
2018/0190340 A1 7/2018 Kim et al.
2018/0218767 A1 8/2018 Wolff
2018/0226119 A1 8/2018 Kim et al.
2018/0233197 A1 8/2018 Laurent
2018/0240511 A1 8/2018 Yoshida et al.
2018/0247876 A1 8/2018 Kim et al.
2018/0254078 A1 9/2018 We et al.
2018/0261268 A1 9/2018 Hyun et al.
2018/0276150 A1 9/2018 Eckert et al.
2018/0285007 A1 10/2018 Franklin et al.
2018/0294028 A1 10/2018 Lee et al.
2018/0308539 A1 10/2018 Ito et al.
2018/0341553 A1 11/2018 Koudele et al.
2018/0342282 A1 11/2018 Morgan

(56) References Cited

U.S. PATENT DOCUMENTS

2019/0013059 A1 1/2019 Akamatsu
2019/0043558 A1 2/2019 Suh et al.
2019/0051344 A1 2/2019 Bell et al.
2019/0051347 A1 2/2019 Lee
2019/0065087 A1 2/2019 Li et al.
2019/0066759 A1 2/2019 Nale
2019/0066766 A1 2/2019 Lee
2019/0088315 A1 3/2019 Saenz et al.
2019/0088316 A1 3/2019 Inuzuka et al.
2019/0103147 A1 4/2019 Jones et al.
2019/0115069 A1 4/2019 Lai
2019/0122722 A1 4/2019 Yamada et al.
2019/0122723 A1 4/2019 Ito et al.
2019/0129651 A1 5/2019 Wuu et al.
2019/0130960 A1 5/2019 Kim
2019/0130961 A1 5/2019 Bell et al.
2019/0139599 A1 5/2019 Ito et al.
2019/0147964 A1 5/2019 Yun et al.
2019/0161341 A1 5/2019 Howe
2019/0190341 A1 6/2019 Beisele et al.
2019/0196730 A1 6/2019 Imran
2019/0198078 A1 6/2019 Hoang et al.
2019/0198099 A1 6/2019 Mirichigni et al.
2019/0205253 A1 7/2019 Roberts
2019/0228810 A1 7/2019 Jones et al.
2019/0228815 A1 7/2019 Morohashi et al.
2019/0237131 A1 8/2019 Ito
2019/0237132 A1 8/2019 Morohashi
2019/0252020 A1 8/2019 Rios et al.
2019/0267077 A1 8/2019 Ito et al.
2019/0279706 A1 9/2019 Kim
2019/0294348 A1 9/2019 Ware et al.
2019/0333573 A1 10/2019 Shin et al.
2019/0347019 A1 11/2019 Shin et al.
2019/0348100 A1 11/2019 Smith et al.
2019/0348102 A1 11/2019 Smith et al.
2019/0348103 A1 11/2019 Jeong et al.
2019/0362774 A1 11/2019 Kuramori et al.
2019/0371390 A1 12/2019 Ito
2019/0385661 A1 12/2019 Koo et al.
2019/0385667 A1 12/2019 Morohashi et al.
2019/0385668 A1 12/2019 Fujioka et al.
2019/0385670 A1 12/2019 Notani et al.
2019/0386557 A1 12/2019 Wang et al.
2019/0391760 A1 12/2019 Miura et al.
2019/0392886 A1 12/2019 Cox et al.
2020/0005857 A1 1/2020 Ito et al.
2020/0051616 A1 2/2020 Cho
2020/0075086 A1 3/2020 Hou et al.
2020/0082873 A1 3/2020 Wolff
2020/0126611 A1 4/2020 Riho et al.
2020/0135263 A1 4/2020 Brown et al.
2020/0143871 A1 5/2020 Kim et al.
2020/0176050 A1 6/2020 Ito et al.
2020/0185026 A1 6/2020 Yun et al.
2020/0194050 A1 6/2020 Akamatsu
2020/0194056 A1 6/2020 Sakurai et al.
2020/0202921 A1 6/2020 Morohashi et al.
2020/0210278 A1 7/2020 Rooney et al.
2020/0211632 A1 7/2020 Noguchi
2020/0211633 A1 7/2020 Okuma
2020/0211634 A1 7/2020 Ishikawa et al.
2020/0219555 A1 7/2020 Rehmeyer
2020/0219556 A1 7/2020 Ishikawa et al.
2020/0265888 A1 8/2020 Ito et al.
2020/0273517 A1 8/2020 Yamamoto
2020/0273518 A1 8/2020 Raad et al.
2020/0279599 A1 9/2020 Ware et al.
2020/0294569 A1 9/2020 Wu et al.
2020/0294576 A1 9/2020 Brown et al.
2020/0321049 A1 10/2020 Meier et al.
2020/0381040 A1 12/2020 Penney et al.
2020/0388324 A1 12/2020 Rehmeyer et al.
2020/0388325 A1 12/2020 Cowles et al.
2020/0395063 A1 12/2020 Rehmeyer
2020/0402568 A1 12/2020 He et al.
2021/0057021 A1 2/2021 Wu et al.
2021/0057022 A1 2/2021 Jenkinson et al.
2021/0109577 A1 4/2021 Mandava et al.
2021/0118491 A1 4/2021 Li et al.
2021/0166752 A1 6/2021 Noguchi
2021/0183433 A1 6/2021 Jenkinson et al.
2021/0183435 A1 6/2021 Meier et al.
2021/0223852 A1 7/2021 Chang et al.
2021/0225431 A1 7/2021 Rehmeyer et al.
2021/0304813 A1 9/2021 Cowles et al.
2021/0335411 A1 10/2021 Wu et al.
2021/0350844 A1 11/2021 Morohashi et al.
2021/0406170 A1 12/2021 Jung et al.
2022/0051716 A1 2/2022 Ayyapureddi
2022/0059153 A1 2/2022 Zhang et al.
2022/0059158 A1 2/2022 Wu et al.
2022/0068361 A1* 3/2022 Du ...................... G11C 11/4076
2022/0091784 A1 3/2022 Brandl
2022/0093165 A1 3/2022 Mitsubori et al.
2022/0165328 A1 5/2022 Ishikawa et al.
2022/0189537 A1 6/2022 Kim
2022/0189539 A1* 6/2022 Li ..................... G11C 11/40611
2022/0199144 A1 6/2022 Roberts
2022/0199150 A1 6/2022 Song et al.
2022/0270670 A1 8/2022 Wu et al.
2022/0270672 A1 8/2022 Kim et al.
2023/0105151 A1 4/2023 Brown et al.
2023/0168818 A1 6/2023 You et al.
2023/0298654 A1* 9/2023 Du .................... G11C 11/40611
365/222
2023/0352075 A1 11/2023 Suzuki
2023/0352076 A1 11/2023 He et al.
2024/0038288 A1 2/2024 Kim et al.
2024/0062798 A1 2/2024 Cowles et al.
2024/0071460 A1 2/2024 Noguchi
2024/0339146 A1 10/2024 Kim
2025/0006243 A1 1/2025 He et al.
2025/0111872 A1 4/2025 Choi et al.
2025/0173255 A1 5/2025 Rooney

FOREIGN PATENT DOCUMENTS

CN 1879173 A 12/2006
CN 101026003 A 8/2007
CN 101038785 A 9/2007
CN 101047025 A 10/2007
CN 101067972 A 11/2007
CN 101075477 A 11/2007
CN 101091221 A 12/2007
CN 101211653 A 7/2008
CN 101217060 A 7/2008
CN 101243450 A 8/2008
CN 102301423 A 12/2011
CN 102663155 A 9/2012
CN 102737706 A 10/2012
CN 102931187 A 2/2013
CN 104350546 A 2/2015
CN 104733035 A 6/2015
CN 104737234 A 6/2015
CN 104781885 A 7/2015
CN 104981874 A 10/2015
CN 105378847 A 3/2016
CN 105529047 A 4/2016
CN 106158005 A 11/2016
CN 106710621 A 5/2017
CN 106816169 A 6/2017
CN 107017016 A 8/2017
CN 107025927 A 8/2017
CN 107301874 A 10/2017
CN 107871516 A 4/2018
CN 107919150 A 4/2018
CN 108154895 A 6/2018
CN 108242248 A 7/2018
CN 108806740 A 11/2018
CN 109727624 A 5/2019
CN 109949844 A 6/2019
CN 110032897 A 7/2019
CN 110520929 A 11/2019

(56) References Cited

FOREIGN PATENT DOCUMENTS

| | | | |
|---|---|---|---|
| CN | 110678925 | A | 1/2020 |
| CN | 110827884 | A | 2/2020 |
| CN | 111052243 | A | 4/2020 |
| CN | 111247586 | A | 6/2020 |
| CN | 111354393 | A | 6/2020 |
| CN | 114121076 | A | 3/2022 |
| JP | S6282887 | A | 4/1987 |
| JP | 2003085054 | A | 3/2003 |
| JP | 2005-216429 | A | 8/2005 |
| JP | 2011-258259 | A | 12/2011 |
| JP | 4911510 | B2 | 1/2012 |
| JP | 2013-004158 | A | 1/2013 |
| JP | 2014238903 | A | 12/2014 |
| JP | 6281030 | B1 | 1/2018 |
| KR | 20030063947 | A | 7/2003 |
| KR | 20070109104 | A | 11/2007 |
| KR | 20160134411 | A | 11/2016 |
| KR | 20170053373 | A | 5/2017 |
| KR | 20170093053 | A | 8/2017 |
| KR | 20180011642 | A | 2/2018 |
| KR | 20180081989 | A | 7/2018 |
| KR | 20180101647 | A | 9/2018 |
| KR | 20190046572 | A | 5/2019 |
| TW | 201801079 | A | 1/2018 |
| WO | 2014120477 | A1 | 8/2014 |
| WO | 2015030991 | A1 | 3/2015 |
| WO | 2017171927 | A1 | 10/2017 |
| WO | 2019079157 | A1 | 4/2019 |
| WO | 2019083884 | A1 | 5/2019 |
| WO | 2019222960 | A1 | 11/2019 |
| WO | 2020010010 | A1 | 1/2020 |
| WO | 2020117686 | A1 | 6/2020 |
| WO | 2020247163 | A1 | 12/2020 |
| WO | 2020247639 | A1 | 12/2020 |

OTHER PUBLICATIONS

U.S. Appl. No. 18/747,740, titled "Apparatuses and Methods Refresh Rate Register Adjustment Based on Refresh Queue" filed Jun. 19, 2024, pp. all pages of application as filed.

U.S. Appl. No. 18/774,730 titled "Apparatuses and Methods for Controller Signaling of Refresh Operations" filed Jul. 16, 2024, pp. all pages of the application as filed.

Kim, et al. "Flipping Bits in MemoryWithout Accessing Them: An Experimental Study of DRAM Disturbance Errors", IEEE, Jun. 2014.

Park, Kyungbae, et al. , Experiments and Root Cause Analysis for Active-Precharge Hammering Fault in DDR3 SDRAM Under 3 X NM Technology; Microelectronics Reliability: An Internet. Journal and World Abstracting Service; vol. 57, Dec. 23, 2015; pp. 39-46.

* cited by examiner

400

* Skipped

| | | | | | | | | | | |
|---|---|---|---|---|---|---|---|---|---|---|
| Pattern 1 | A | A | B | A | A | B | A | A | B | A |
| Pattern 2 | A | A | A | A | A | A | A | A | A | A |
| Pattern 3 | A | B | A | B | A | B | A | B | B | A |
| Pattern 4 | A | B | C | A | B | C | A | B | C | A |

FIG. 4

APPARATUSES AND METHODS FOR DIRECT REFRESH MANAGEMENT ATTACK IDENTIFICATION

CROSS REFERENCE TO RELATED APPLICATION(S)

This application claims the benefit under 35 U.S.C. § 119 of the earlier filing date of U.S. Provisional Application Ser. No. 63/586,538 filed Sep. 29, 2023 the entire contents of which is hereby incorporated by reference in its entirety for any purpose.

BACKGROUND

Information may be stored on memory cells of a memory device. The memory cells may be organized at the intersection of word lines (rows) and bit lines (columns). Information in the memory cells may decay over time. For example, the information may be stored as a charge on a capacitor which may decay over time. The memory device may perform refresh operations to restore the information and prevent information from being lost.

Certain patterns of access may cause an increased rate of information decay in nearby memory cells (e.g., the memory cells along nearby word lines). Memories may use various schemes to identify which memory cells are affected by such patterns such that targeted refresh operations can be performed before those memory cells lose their information. A controller of the memory may also monitor access patterns and instruct the memory to refresh certain word lines. However, this process may itself be used to generate patterns which cause information decay. There may be a need for the memory to monitor the refresh addresses provided by the controller.

BRIEF DESCRIPTION OF THE DRAWINGS

FIG. 4 is a table of example patterns of DRFM addresses according to some embodiments of the present disclosure.

DETAILED DESCRIPTION

Figure 1:
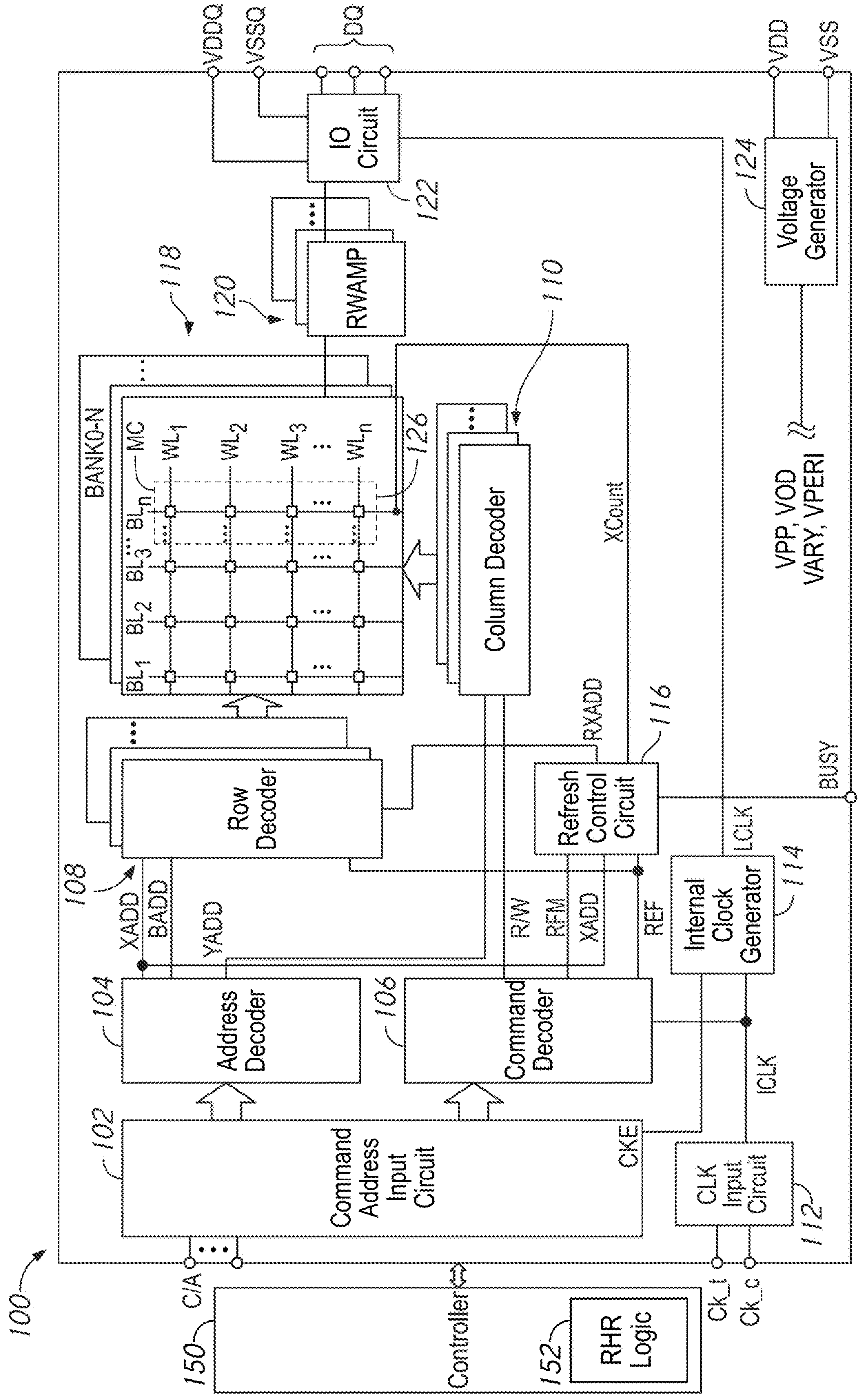
FIG. 1 is a block diagram of a semiconductor device according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Information in a memory array may be accessed by one or more access operations, such as read or write operations. During an example access operation a word line may be activated based on a row address and then selected memory cells along that active word line may have their information read or written to based on which bit lines are accessed, which may be based on a column address. The memory array may be refreshed on a row by row basis (e.g., as part of an auto-refresh and/or self-refresh mode) where the memory cells along each row are refreshed periodically. The speed at which the rows are refreshed (e.g., the maximum time any given row will go between refreshes) may be determined based on an expected rate of information decay.

Various patterns of access to a row (an aggressor row) may cause an increased rate of information decay in nearby memory cells (e.g., along victim rows). For example, a 'row hammer' may involve repeated accesses to the aggressor row which may increase a rate of decay in adjacent rows (and/or in rows which are further away). Accordingly, it may be important to track a number of accesses to each row to determine if they are aggressors, such that the victim rows can be identified and refreshed as part of a targeted refresh operation. For example, each word line may have an associated count value which is used to determine how many times that word line has been accessed. Based on those access counts, rows may be identified for targeted refresh operations and stored in a targeted refresh queue or aggressor queue.

The memory may determine when to perform targeted refresh operations based on internal logic. In addition to the internal logic, (or instead) a controller may issue a refresh management (RFM) command. Responsive to the RFM command the memory may perform one or more targeted refresh operations based on an address in the targeted refresh queue. The controller may also monitor access operations and provide a direct RFM (DRFM) command, where the controller specifies the aggressor address and instructs the memory to perform a targeted refresh on the victims of that aggressor. However, situations may occur where if many DRFM commands are performed on the same aggressor, the repeated refreshing of the same victim word lines may in turn cause those victim word lines to become aggressors in turn, causing an increased rate of information decay in word lines which are outside the range of victims being refreshed by the address specified by the DRFM command. Since this may cause information loss, it may be important to track the addresses specified by the DRFM command in order to prevent repeated refreshes to the same The present disclosure is drawn to apparatuses, systems, and methods for direct refresh management attack identification. A memory device receives DRFM commands along with a DRFM aggressor address. The DRFM aggressor address is compared to a stored previous DRFM aggressor address by a DRFM logic circuit. If there is not a match, a targeted refresh operation is performed on the victims of the DRFM aggressor address and the DRFM aggressor address is stored as the previous DRFM aggressor address. If there is a match, then the DRFM operation may be skipped.

In some embodiments, the DRFM logic circuit may skip N repeated DRFM commands with a same DRFM aggressor addresses in a row, then allow M of those operations, before skipping N repeated addresses again. For example, if a single DRFM address is constantly provided, then the DRFM logic may perform one DRFM operation, skip 3, then perform one, skip 3, and so forth. In some embodiments, the DRFM logic circuit may implement different skip logic for different victim address calculations. For example, the DRFM logic circuit may apply different values of N and M for different victim address calculations. In an example implementation, if a same address is provided, then refresh operations of victims closer to the DRFM aggressor (e.g., +/−1 refreshes) may occur more frequently than refresh operations of victims further away (e.g., +/−3 refreshes). In other words, further victim addresses may be skipped more frequently.

In some embodiments, when a DRFM operation is skipped, the memory may perform some other action instead. For example, responsive to a DRFM operation begins skipped, the memory may perform a targeted refresh on the victims of an address stored in the targeted refresh queue (e.g., a normal RFM operation).

In some embodiments, the DRFM aggressor address may be captured from the row address bus responsive to a DRFM sampling command, and then that address may be refreshed responsive to a DRFM flush command. In some embodiments, the controller may issue these as separate commands. In some embodiments, the controller may issue a single command and the memory may generate the sampling and flush commands. Responsive to the DRFM sampling command the current address along the row address bus is stored in a first register and compared to a previous DRFM address in the second register, with the result of that comparison determining what happens responsive to the DRFM flush command. FIG. 1 is a block diagram of a semiconductor device according to at least one embodiment of the disclosure. The semiconductor device 100 may be a semiconductor memory device, such as a DRAM device integrated on a single semiconductor chip. Also shown is a controller 150, which may operate the memory device 100. The controller 150 may represent a processor or other unit which stores and retrieves data from the memory device 100. In some embodiments, the controller 150 and memory 100 may be integrated onto a single circuit or chip. In some embodiments, the controller 150 and memory 100 may be separate components. The memory 100 and controller 150 are communicatively coupled along a number of buses, such as data buses, clock buses, and command/address buses, which are not shown in FIG. 1.

The semiconductor device 100 includes a memory array 118. The memory array 118 is shown as including a plurality of memory banks. In the embodiment of FIG. 1, the memory array 118 is shown as including eight memory banks BANK0-BANK7. More or fewer banks may be included in the memory array 118 of other embodiments. Each memory bank includes a plurality of word lines WL (rows), a plurality of bit lines BL (columns), and a plurality of memory cells MC arranged at intersections of the plurality of word lines WL and the plurality of bit lines BL.

The selection of the word line WL is performed by a row decoder 108 and the selection of the bit lines BL is performed by a column decoder 110. In the embodiment of FIG. 1, the row decoder 108 includes a respective row decoder for each memory bank and the column decoder 110 includes a respective column decoder for each memory bank. The bit lines BL are coupled to a respective sense amplifier (SAMP). Read data from the bit line BL is amplified by the sense amplifier SAMP, and transferred to read/write amplifiers 120 over complementary local data lines (LIOT/B), transfer gate (TG), and complementary main data lines (MIOT/B). Conversely, write data outputted from the read/write amplifiers 120 is transferred to the sense amplifier SAMP over the complementary main data lines MIOT/B, the transfer gate TG, and the complementary local data lines LIOT/B, and written in the memory cell MC coupled to the bit line BL.

The semiconductor device 100 may employ a plurality of external terminals that include command and address (C/A) terminals coupled to a command and address bus to receive commands and addresses, and a CS signal, clock terminals to receive clocks CK and/CK, data terminals DQ to provide data, and power supply terminals to receive power supply potentials VDD, VSS, VDDQ, and VSSQ. One or more of the external terminals may be coupled to the controller 150.

The clock terminals are supplied with external clocks CK and/CK by the controller 150 that are provided to an input circuit 112. The external clocks may be complementary. The input circuit 112 generates an internal clock ICLK based on the CK and/CK clocks. The ICLK clock is provided to the command decoder 110 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data.

The C/A terminals may be supplied with memory addresses by the controller 150. The memory addresses supplied to the C/A terminals are transferred, via a command/address input circuit 102, to an address decoder 104. The address decoder 104 receives the address and supplies a decoded row address XADD to the row decoder 108 and supplies a decoded column address YADD to the column decoder 110. The address decoder 104 may also supply a decoded bank address BADD, which may indicate the bank of the memory array 118 containing the decoded row address XADD and column address YADD. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide a row command signal to select a word line and a column command signal to select a bit line.

The device 100 may receive an access command which is a read command. Responsive to the read command, data is read out from the memory array 118 to the data terminals DQ. The data is read out from memory cells in a bank specified by BADD at the intersection of a word line specified by XADD and bit line(s) specified by YADD. The read command is received by the command decoder 106, which provides internal commands such as a row activation signal ACT and a read signal R. Responsive to ACT and the row address XADD, the row decoder 108 activates the specified word line and responsive to R and the column address YADD the column decoder 110 couples the sense amplifiers coupled to the specified bit lines to the read/write amplifier 120, to read out the values along those bit lines from the memory cells at the intersection with the active word line as read data to the IO circuit 122. The read data is output to outside from the data terminals DQ via the input/output circuit 122. A pre-charge command Pre pre-charges the word line and deactivates (or closes it).

The device 100 may receive an access command which is a write command. Responsive to the write command, data received along the DQ terminals is written to the memory array 118. The data is written to the memory cells in a bank specified by BADD at the intersection of a word line specified by XADD and bit line(s) specified by YADD. The write command is received by the command decoder 106 which provides internal commands such as ACT and a write signal W. The IO circuit 122 receives data from the DQ terminals which is provided to the read/write amplifiers 120. Responsive to ACT, the row decoder activates a word line specified by XADD, and responsive to W, the column decoder 110 couples the write data from the read/write amplifiers 120 to the bit lines specified by YADD, where the sense amplifiers amplify the write data so that it is written to the memory cells at the intersection with the active word line. The pre-charge Pre closes the word line.

The device 100 may also receive commands from the controller 150 causing the device 100 to carry out refresh operations. For example, a controller 150 of the memory may put the device 100 into an auto-refresh mode and provide refresh signal REF. The device 100 may also enter a self-refresh mode where the refresh signal is generated internally. The controller 150 may also provide an RFM or DRFM command, which causes the memory 100 to perform a targeted refresh operation, as described in more detail herein.

The refresh signal REF is supplied to the refresh address control circuit 116. The refresh address control circuit 116 supplies a refresh row address RXADD to the row decoder 108, which refreshes memory cells along a word line WL identified by the refresh row address RXADD. The refresh control circuit 116 may perform sequential or normal refresh operations, where the refresh address RXADD is generated based on sequential logic of the refresh control circuit 116, or may perform a targeted refresh operation, wherein the refresh address RXADD is based on an identified aggressor address stored in an aggressor queue of the refresh control circuit 116.

During a sequential or normal refresh operation, the refresh control circuit 116 may use sequence logic to determine the next RXADD. For example, RXADD may be based on a previous value of RXADD (e.g., RXADD(i+1)=RXADD(i)+1). A counter circuit may be used to generate the sequential refresh addresses. During a targeted refresh operation, the refresh control circuit 116 may generate RXADD based on an identified aggressor addresses. For example, the refresh address may represent the word lines which are physically adjacent to the word line associated with the aggressor address. In some embodiments, a sequential refresh address may be associated with more word lines than a targeted refresh address. During internally directed targeted refresh operations or targeted refresh operations performed based on RFM commands, the aggressor address is one identified by the refresh control circuit 118. During targeted refresh operations performed based on DRFM commands, the aggressor address is a DRFM aggressor address provided by the controller.

When the refresh control circuit 116 receives the refresh signal REF, it may perform a set of refresh operations, and may determine whether those refresh operations are sequential or targeted refresh operations based on internal logic. For example, responsive to REF, the refresh control circuit may perform a set of refresh operations, and every N sequential refresh operations, one or more targeted refresh operations may be performed. When the refresh control circuit 116 receives the RFM signal from the RFM timing circuit 132, it performs one or more targeted refresh operations.

The refresh control circuit 116 identifies aggressor addresses using one or more criteria. For example, a pattern of accesses to the different addresses may be used. In the example of FIG. 1, an aggressor detection scheme is shown which uses per-row access counts or per-row hammer tracking (PRHT). However, other schemes for detecting aggressor addresses may be used in other example embodiments instead of or in addition to PRHT.

In the example of FIG. 1 as part of PRHT, each word line includes a number of counter memory cells 126, which store a count value XCount associated with that word line. The count value XCount may represent a number of times that the word line has been accessed. When a row is accessed, (e.g., by ACT and XADD) the count value XCount is read out and updated (e.g., by being incremented). If the updated count value has crossed a threshold, the row address XADD is judged to be an aggressor and is added the aggressor queue. When the address is added to the queue, the count value in the counter memory cells 126 may be reset. If the count has not crossed the threshold, the updated count value is written back to the counter memory cells 126.

The controller 150 may also perform its own tracking of aggressor addresses. For example, the controller 150 may include targeted refresh or row hammer refresh (RHR) logic circuits 152, which monitor the addresses provided to the memory 100 and determine if they are aggressor addresses. If an address is determined to be an aggressor, the RHR logic circuit 152 may issue a DRFM command to the memory 100. The DRFM command may specify a DRFM aggressor address and instruct the memory 100 to perform one or more targeted refresh operations based on the DRFM aggressor address. For example, the controller 150 may provide a DRFM command while the DRFM aggressor address is being provided along the C/A bus (e.g., as part of an access operation) and the command decoder 106 may cause the refresh control circuit 116 to sample (or latch) the DRFM aggressor address.

When the refresh control circuit 116 receives a DRFM aggressor address, it compares the DRFM aggressor address to a previous DRFM aggressor address. If there is not a match, the targeted refresh operation responsive to the DRFM command may be performed on the DRFM aggressor address. If there is a match, then the targeted refresh operation on the DRFM aggressor address may be skipped. In this manner, the refresh control circuit 116 may prevent multiple consecutive DRFM operations from being performed on the same DRFM aggressor address. In some embodiments, the refresh control circuit 116 may include a counter, and may count a number of times the DRFM aggressor address matches a previous address. The counter may allow all or part of normal DRFM operations to proceed when the counter has a certain value or values. In an example implementation, the counter may increment each time the addresses match and may count from 0 to 3 before resetting back to 0. The DRFM logic may skip operations when the counter is 0 or 1 but allow them on 2 and 3. Other example implementations may be used in other embodiments.

The power supply terminals are supplied with power supply potentials VDD and VSS. The power supply potentials VDD and VSS are supplied to an internal voltage generator circuit 124. The internal voltage generator circuit 124 generates various internal potentials VPP, VARY, VPERI, and the like based on the power supply potentials VDD and VSS supplied to the power supply terminals. The internal potential VPP is mainly used in the row decoder 108, the internal potentials VARY are mainly used in the sense amplifiers SAMP included in the memory array 118, and the internal potential VPERI is used in many peripheral circuit blocks.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
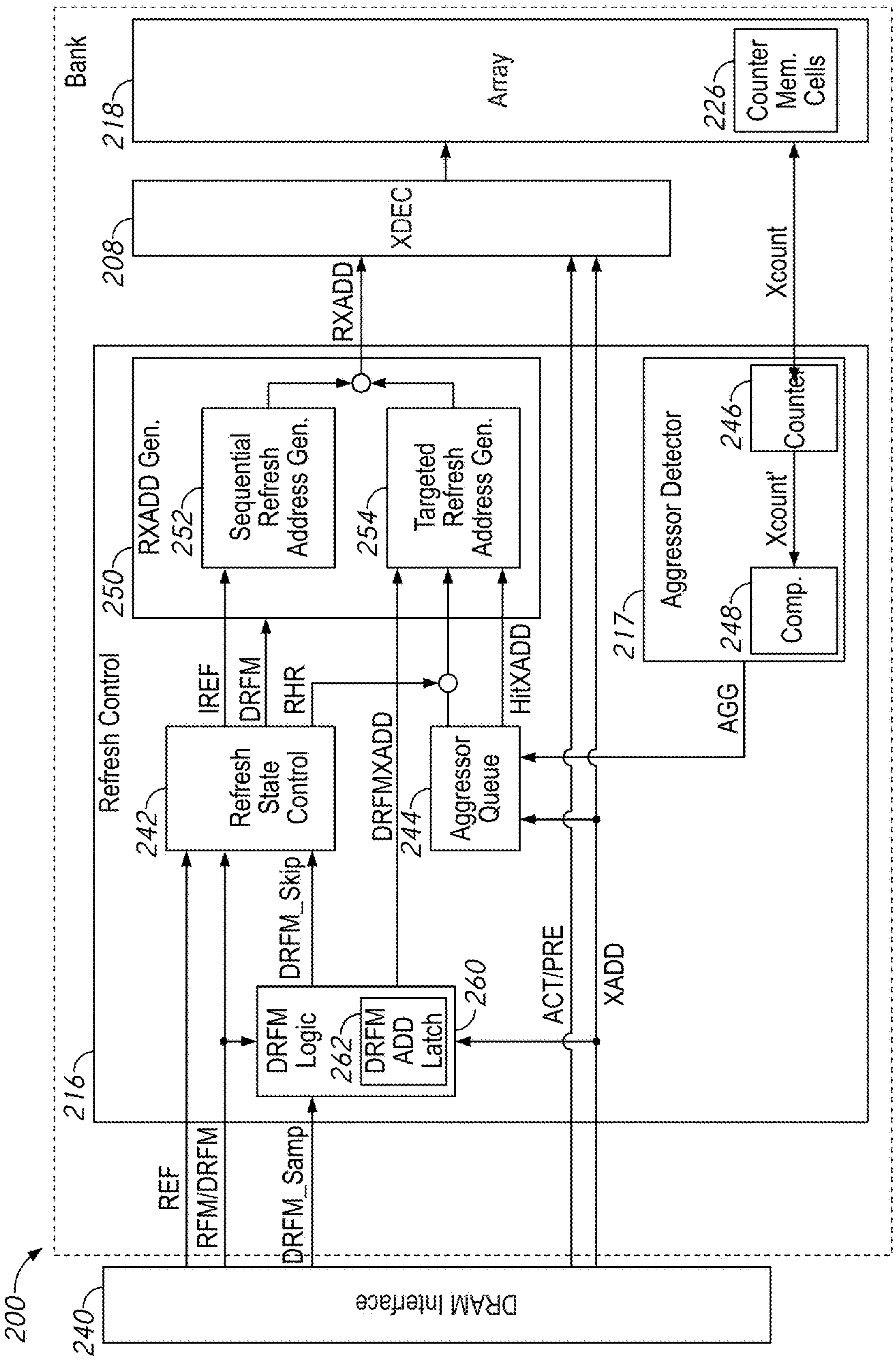
FIG. 2 is a block diagram of a portion of a memory according to some embodiments of the present disclosure.

FIG. 2 is a block diagram of a portion of a memory according to some embodiments of the present disclosure. FIG. 2 shows an example of portions of a memory relevant to refresh operations. Certain components and signals have been omitted from the view of FIG. 2. In some embodiments, the memory 200 may, in some embodiments, implement a portion of the memory device 100 of FIG. 1.

The memory 200 of FIG. 2 shows a DRAM interface 240, which represent various components of the memory which provide signals such as the row address XADD, row activation signal ACT and refresh signal REF, as well as an RFM command RFM. A refresh control circuit 216 (e.g., 116 of FIG. 1) performs refresh operations responsive to either the refresh signal REF or the RFM command RFM. Responsive to the signals REF or RFM, the refresh control circuit 216 provides a refresh address RXADD, and the row decoder 208 (e.g., 108 of FIG. 1) performs a refresh operation on memory cells of the array 218 (e.g., 118 of FIG. 1).

The DRAM interface 240 also provides signals related to a DRFM operation. The DRAM interface 240 provides a DRFM flush signal DRFM and a DRFM sampling signal DRFM_Samp. In some embodiments, both signals may be provided (e.g., by a command decoder) responsive to a DRFM command from a controller. A DRFM logic circuit 260 receives a DRFM sample command DRFM_Samp and stores the row address XADD as a DRFM aggressor address DRFMXADD. The DRFM logic circuit 260 determines if a DRFM skip signal DRFM_Skip should be provided based on comparison of the sampled address to a previously sampled address. Responsive to a DRFM flush signal DRFM, the refresh control circuit 216 performs a targeted refresh based on DRFMXADD, unless the signal DRFM_Skip is active, in which case the operation is skipped (or a different type of targeted refresh operation is performed).

The refresh control circuit 216 includes a refresh state control circuit 242 which determines whether a targeted or sequential refresh operation will be performed by issuing an internal refresh signal IREF and/or a targeted refresh signal RHR. Responsive to the refresh signals IREF/RHR, a refresh address generator circuit 250 provides the refresh address RXADD. The refresh control circuit 216 also includes an aggressor detector circuit 217 which identifies aggressor addresses and stores them in an aggressor queue 244. When the refresh state control circuit 242 signals a targeted refresh operation (e.g., by providing RHR) the refresh address generator circuit 250 uses one of the addresses in the aggressor queue 244 to generate the refresh address RXADD. When the refresh state control circuit 242 indicates a DRFM operation, the refresh address generator 250 uses the address DRFMXADD to generate RXADD.

In FIG. 2 a dotted line box is used to represent components which may be repeated on a bank-by-bank basis within the memory. For example, each bank may have its own row decoder 208, refresh control circuit 216, and memory array 218. Other arrangements of which components are repeated on a per-bank basis and which are shared by multiple banks may be used in other example embodiments.

The refresh state control circuit 242 controls which refresh operations and how many are performed responsive to the signals REF and/or RFM/DRFM. The refresh state control circuit 242 provides an internal refresh signal IREF and a targeted refresh signal RHR. The signal IREF may indicate a sequential refresh operation, while RHR may indicate a targeted refresh operation. In some embodiments, IREF alone may indicate a sequential or normal refresh operation, while IREF and RHR active at the same time indicate a targeted refresh operation. In some embodiments, IREF and RHR may be active separately to indicate different types of refresh operation.

Responsive to the refresh signal REF, the refresh state control circuit 242 may perform a number of refresh operations or pumps. For example, a number of activations of IREF. Responsive to REF, the refresh state control circuit 242 may perform a mix of sequential and targeted refresh operations, based on internal logic. For example some number of N of sequential refresh operations (e.g., by providing IREF) may be performed along with some number M of targeted refresh operations (e.g., by providing RHR). For example, the refresh state control circuit 242 may perform four pumps, with two being normal refresh operations and two being targeted refresh operations. Responsive to the signal RFM the refresh state control circuit 242 performs a number of targeted refresh operations (e.g., two or four targeted refresh operations) by providing the signal RHR.

Responsive to a DRFM operation, as indicated by a DRFM flush signal DRFM when the DRFM skip signal DRFM_Skip is inactive, the refresh state control circuit 242 performs one or more targeted refresh operations. The refresh state control circuit 242 may provide a signal, such as DRFM, to the refresh address generator (e.g., instead of or in addition to the signal RHR) to indicate that the refresh address RXADD should be generated based on the DRFM aggressor address DRFMXADD. Responsive to a skipped DRFM operation, as indicated by the signal DRFM and the signal DRFM_Skip being active, the refresh state control circuit 242 may skip the DRFM operation. In some embodiments, the refresh state control circuit 242 may perform other refresh operations, such as targeted refresh operations, during the time when a DRFM operation would have been performed. For example the refresh state control circuit 242 may provide IREF and/or RHR but not DRFM responsive to the signal DRFM when DRFM_Skip is active.

The refresh address generator circuit 250 includes a sequential refresh address generator circuit 252 which provides a sequential refresh address as RXADD responsive to IREF (or to IREF alone). The sequential refresh address generator circuit 252 generates the refresh address based on sequence logic. For example, the refresh address may be generated based on an address provided as part of a previous sequential refresh operation.

The refresh address generator circuit 250 includes a targeted refresh address generator circuit 254 which provides a targeted refresh address as RXADD responsive to RHR and an identified aggressor address HitXADD from the aggressor queue 244 or provides RXADD based on DRFMXADD responsive to the signal DRFM (or to DRFM and RHR together). Since the logic used to generate the targeted refresh address may be similar other than the source of the aggressor address for targeted refresh operations, the operation of the targeted refresh address generator circuit 254 will generally be described with respect to HitXADD, however, DRFMXADD may be substituted in the case of DRFM operations.

The targeted refresh address generator circuit 254 generates the refresh address based on the aggressor address HitXADD. For example the refresh address RXADD may represent a word line adjacent to the word line represented by HitXADD (e.g., RXADD=HitXADD+/−1). Other relationships between the refresh address and aggressor address may be used in other example embodiments (e.g., HitXADD +/−2, +/−3, etc.). In some embodiments, multiple targeted refresh operations may be performed on a single aggressor address to capture multiple victims (e.g., refresh addresses may be generated for +/−1, +/−2, etc.)

The refresh control circuit 216 includes an aggressor detector circuit 217 which determines if an accessed address XADD should be added to the aggressor queue 244 as an aggressor address HitXADD. Various schemes may be used to determine if the address should be added to the queue. FIG. 2 shows an example embodiment where PRHT in counter memory cells 226 (e.g., 126 of FIG. 1) is used. Other aggressor tracking schemes may be used in other example embodiments.

When a row is accessed, its count value XCount is read out from the counter memory cells 226 to the aggressor detector 217. A counter circuit 246 updates the count value, to an updated count value XCount'. In some embodiments, the counter circuit 246 may update the count value by incrementing XCount (e.g., XCount'=XCount+1). The aggressor detector circuit 217 includes a comparator circuit 248 which compares the updated count value XCount' to a threshold. If the count has not crossed the threshold (e.g., is less than the threshold) then the updated count value is written back to the counter memory cells 226. If the count has crossed the threshold (e.g., is greater than or equal to the threshold) then the aggressor detector circuit provides a signal AGG to indicate that the current row address is an aggressor. The updated count value is reset (e.g., to an initial value such as 0) and written back to the counter memory cells 226.

In some embodiments, the threshold may represent a maximum value of the binary number of the count value. The count value may cross the threshold by 'rolling over' from a maximum value to a minimum value. In such embodiments, the comparator 248 may be omitted, and the counter 246 may send the signal AGG when the count rolls over.

Responsive to the signal AGG, the aggressor queue 244 adds the current row address XADD to the queue. The aggressor queue 244 may be a register which includes a number of slots, each of which stores a row address. Each slot includes a number of latch circuits, such as content addressable memory (CAM) cells or other types of latch, which store a bit of the address stored in that slot. The number of slots in the queue may generally be referred to as a 'depth' of the aggressor queue 244.

Responsive to the signal RHR, the aggressor queue 244 provides an address as the aggressor address HitXADD to the targeted refresh address generator circuit 254. After providing the address, the address is removed from the queue (or the slot is marked as empty so it can be overwritten). The queue 244 may use various logic to determine which address is provided. For example it may act as a FIFO queue. In some embodiments, if the queue 244 is full when the signal AGG is received, the refresh control circuit 216 may provide a signal to indicate an alert. In some embodiments, the controller may issue a sequence of RFM commands to clear the queue responsive to the queue full alert. Responsive to the signal AGG, the aggressor queue 244 may search for an open slot (e.g., one which does not store an address or one where the address has already been provided as HitxADD) and store the current address XADD in the open slot.

The DRFM logic circuit 260 determines if a DRFM operation should be skipped based on a comparison between a current DRFM aggressor address and the previous DRFM aggressor address. Responsive to a DRFM sampling command DRFM_Samp, the DRFM logic 260 stores the address XADD in a latch 262 and compares it to a previous DRFM address. If there is a match, the signal DRFM_Skip is provided at an active level. If there is not a match, the signal DRFM_Skip is not provided, and the address is stored as the previous address for a next comparison.

In some embodiments, the DRFM logic circuit 260 may include a counter circuit which counts a number of times DRM_Skip is provided. When the counter reaches a threshold value, it is reset and the DRFM_Skip signal is not provided even if the sampled address and the previous address match. The counter may also be reset when the sampled address changes (e.g., when there is not a match). In some embodiments, certain values of the counter may cause the DRFM logic circuit 260 to skip DRFM operations, while other values may cause the DRFM logic circuit 260 to allow DRFM operations.

In some embodiments, the DRFM logic circuit 260 may employ different logic (e.g., different counters) for different calculations of refresh address. For example, if there is not a match, then the refresh address generator 250 may provide DRFMXADD+/−1, +/−2, +/−3, and +/−4 as refresh addresses (e.g., 8 refresh addresses) as part of the DRFM operation. The DRFM logic circuit 260 may use different counter logic to skip some of those victim calculations compared to other victim calculations. In some embodiments, different logic may be applied to groups further away from the aggressor. For example, all refreshes (+/−1, +/−2, +/−3, +/−4) may be skipped at a first rate, +/−2, +/−3, and +/−4 may be skipped at a second rate, +/−3 and +/−4 may be skipped at a third rate, and +/−4 may be skipped at a fourth rate. Other groupings of address calculations and rates may be used in other example embodiments. In an example implementation, a four bit counter may be used and incremented each time the addresses match. On values of 0 and 1, all refreshes may be skipped. On values of 2 and 3, +/−1 and +/−2 refreshes may be performed, while +/−3 and +/−4 are skipped. When there is not a match, all refreshes are performed.

Figure 3:
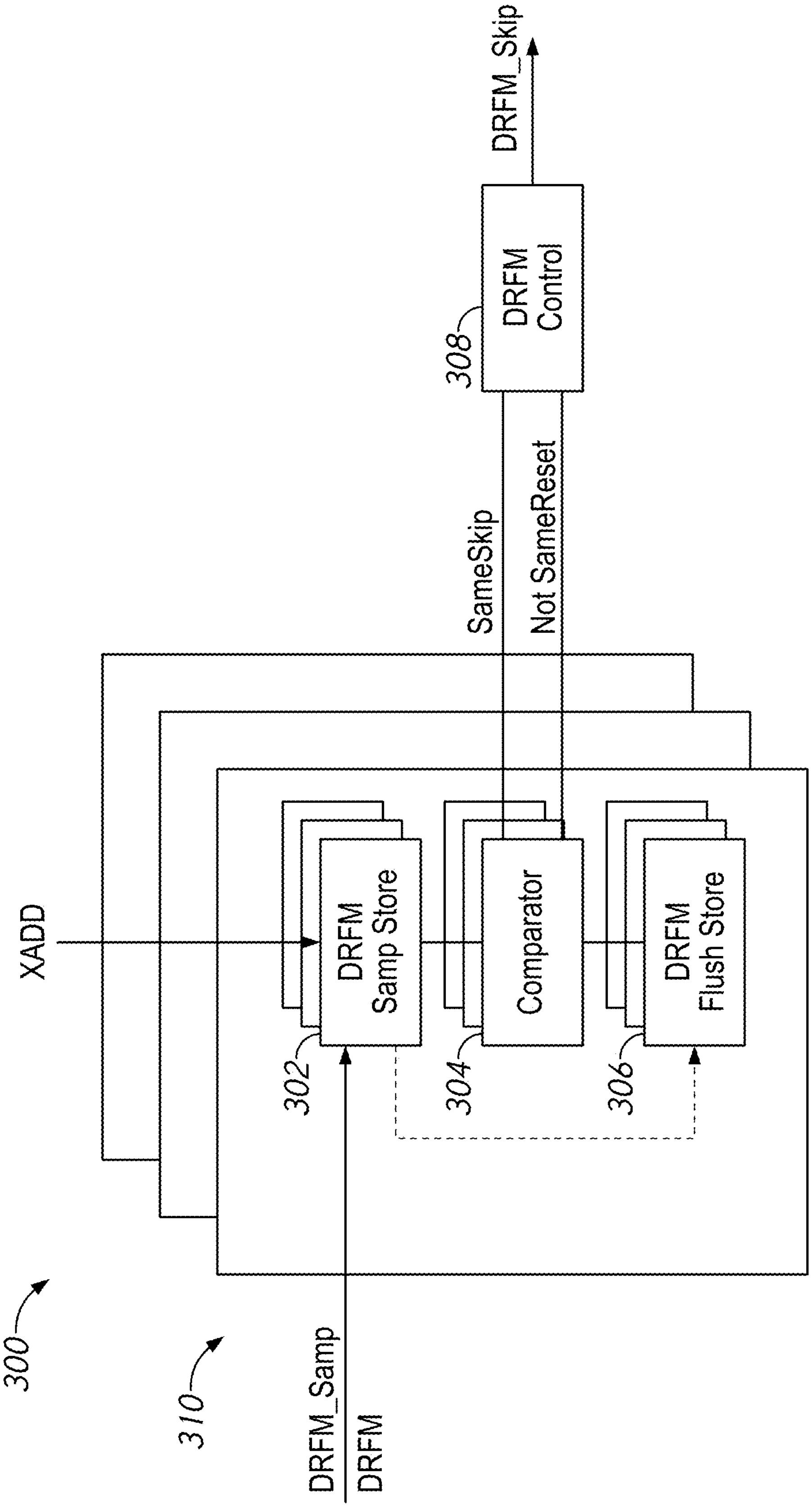
FIG. 3 is a block diagram of a DRFM logic circuit according to some embodiments of the present disclosure.

FIG. 3 is a block diagram of a DRFM logic circuit according to some embodiments of the present disclosure. The DRFM logic circuit 300 may, in some embodiments, implement the DRFM logic circuit 260 of FIG. 2. The DRFM logic circuit 300 includes one or more address management circuits 310, and a DRFM control circuit 308. The address management circuits 310 each store a prior DRFM aggressor address and compare the current address to the stored address in that address management circuit. Each DRFM logic circuit includes a first register 302, a second register, and a comparator circuit 304. Based on the outputs from the address management circuits 310, the DRFM control circuit 308 determines whether or not to provide the DRFM skip signal DRFM_Skip.

Since the DRFM address management circuits 310 may be generally similar to each other, only a single address management circuit is described in detail herein. In some embodiments, only a single address management circuit may be used. In some embodiments, multiple address management circuits may be used, such as two, three, or more address management circuits. Each address management circuit allows the DRFM logic circuit 300 to track an additional previous DRFM aggressor addresses.

In an example embodiment with a single address tracking circuit 310, responsive to the DRFM sampling signal (e.g., DRFM_Samp of FIG. 2) an address XADD is stored in the first register 302. The comparator circuit 304 compares the address stored in the first register 302 to an address stored in the second register 306. If there is a match, the comparator provides a skip signal SameSkip to the control circuit 308. If there is not a match, the comparator circuit 304 provides a reset signal NotSameReset to the control circuit 308.

Responsive to a DRFM flush signal (e.g., DRFM of FIG. 2) the address from the first register 302 is moved to the second register 306. In this manner, the second register 306 stores a previous DRFM address.

The control circuit 308 changes a count value responsive to SameSkip (e.g., by incrementing the count value). If the count value is below a threshold, the control circuit 308 provides the DRFM skip signal DRFM_Skip at an active level. If the count value is at the threshold, then the count value is reset and the signal DRFM_Skip is not provided responsive to the signal SameSkip. In some embodiments, the count value may reach a maximum value and 'roll over' to an initial value and when the count value rolls over it may act as the count reaching the threshold. For example, if the counter is a two-bit counter, then DRFM_Skip may be provided for 3 out of every four activations of SameSkip (assuming that NotSameReset is not provided). When the control circuit 308 receives the reset signal NotSameReset, the count value is reset to an initial value and the signal DRFM_Skip is not provided.

In some embodiments, there may be multiple address tracking circuits 310. For example, in an embodiment with two address tracking circuits there may be two comparators 304 and two second registers 306. When an address is sampled both comparators compare the sampled address to their respective second register. Each comparator separately provides the signal SameSkip or NotSameReset based on that comparison. The control circuit 308 receives the signals and determines what to do based on those signals. For example, if the sample address matches neither stored address (e.g., both signals are NotSameReset) then one of the two second registers is reset and the sampled address is written to that register. For example, an older of the two stored addresses may be overwritten. If one of the signals SameSkip is active, then the control circuit may update a count value associated with that address tracking circuit and provide the DRFM_Skip signal until the counter reaches the threshold or is reset.

In some embodiments, the first latch 302 may be shared by multiple address tracking circuits 310, so that the same DRFM aggressor address is provided to each of the comparators.

FIG. 4 is a table of example patterns of DRFM addresses according to some embodiments of the present disclosure. The table 400 represents four different patterns of addresses provided as part of DRFM operations. Three different addresses are shown, which are noted as A, B, and C. The table 400 shows how a DRFM logic circuit, such as 260 of FIG. 2 and/or 300 of FIG. 3 may respond to different example sequences of addresses. The behavior represented by the table 400 is only one example of how a DRFM logic circuit may respond to patterns of addresses, and different operations may be used in other example embodiments. The example of FIG. 4 represents the operation of a DRFM logic circuit with two address tracking circuits, each of which is associated with a two-bit counter (e.g., a threshold of 4). The patterns and which addresses are skipped are based on the circuit initializing just before the first address is shown in each of the example patterns. The skipped addresses are shown in boxes.

The table 400 shows four example patterns of addresses. In the first pattern, the sequence of DRFM addresses AAB is repeated over and over. In this pattern, the memory performs targeted refresh operations on the address A, skips the next DRFM operation (on A) and then performs the next DRFM operations on B and A before skipping the second DRFM operation on A and so forth.

In the second pattern, the address A is repeatedly received as the DRFM address. In this patter, the first time the address A is received a DRFM operation is performed. The next three DRFM operations on A are skipped (e.g., as the counter increases). A fifth time that A is provided, the counter resets and the DRFM operation is performed again on A.

In the third pattern, the addresses AB is repeated over and over. The first time A is provided it is stored in a first address management circuit and a DRFM is performed on A. The first time B is provided it is stored in the second address management circuit and a DRFM operation is performed on B. The second time A is provided it is compared to the first and the second management circuits and because there is a match, the DRFM operation on A is skipped. The second time B is provided it is compared to the address management circuits and matches with the second circuit, but not the first, which resets the first address management circuit (and associated counter). Because there is a match with the second circuit the DRFM operation on B is skipped. A third time that A is received since the first address management circuit was reset, the DRFM operation is performed on A and the second DRFM address management circuit is reset. A third time that B is received the DRFM is performed on B and so forth.

In the fourth example patter, the addresses ABC are received over and over. Since this pattern resets both address management circuits each time, no DRFM operations are skipped.

Figure 5:
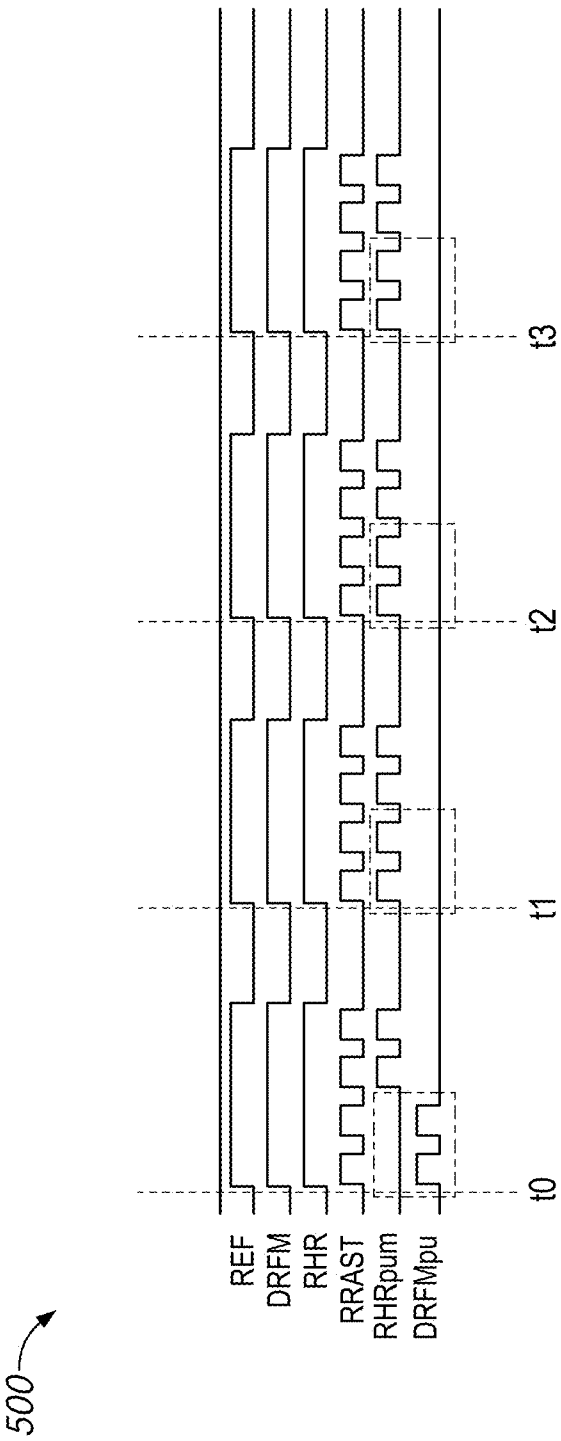
FIG. 5 is a timing diagram of example operations of a refresh control circuit according to some embodiments of the present disclosure.

FIG. 5 is a timing diagram of example operations of a refresh control circuit according to some embodiments of the present disclosure. The timing diagram 500 may, in some embodiments, be implemented by one or more of the apparatuses or systems described herein. For example, the timing diagram may represent the operations of the refresh control circuit 116 of FIG. 1 and/or 200 of FIG. 2. The timing diagram 500 represents operations in a memory with a DRFM logic circuit such as the DRFM logic circuit 260 of FIG. 2 and/or 300 of FIG. 3.

In the example of FIG. 5, as part of performing a DRFM operation, the refresh control circuit performs four total refresh operations, two of which are DRFM operations and two of which are targeted refresh operations (e.g., using addresses from the aggressor queue). The timing diagram shows 4 consecutive DRFM operations, each of which may be associated with a same DRFM aggressor address (e.g., Pattern 2 of the Table 400 of FIG. 4). At some time before the initial time t0, the address is provided along with a sample signal. At the first time t0, a DRFM command is received, and four refresh pumps RRAST are generated. The first two pumps are DRFM pumps DRFMpump. The next two pumps are targeted refresh pumps RHRpump. The next three times t1, t2, and t3 that DRFM flush commands are received, the skip signal is active, and so four refresh pumps are still generated, but all four pumps are targeted refresh pumps, since the targeted refresh operations are replacing the skipped DRFM operations.

Figure 6:
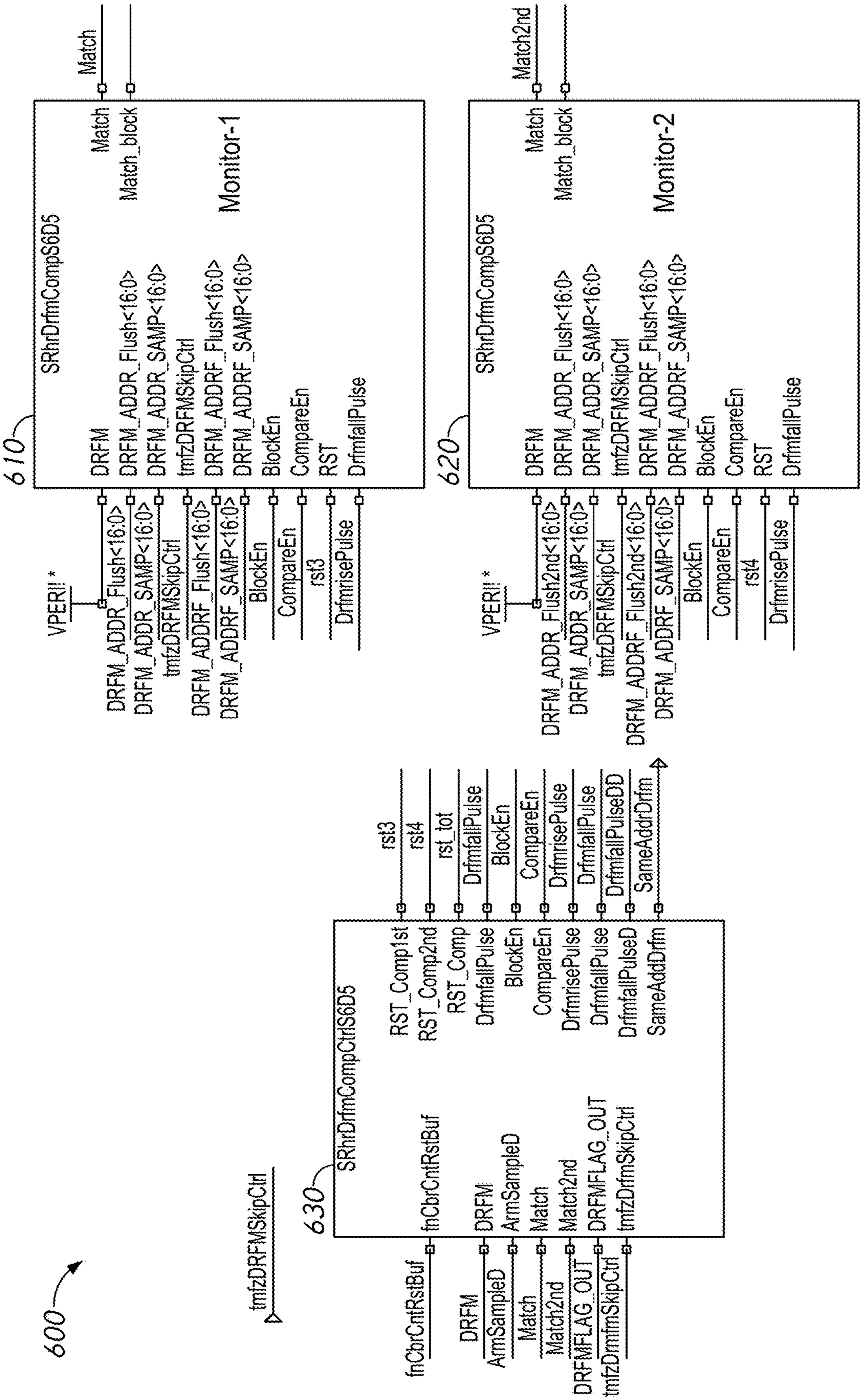
FIG. 6 is a schematic diagram of a DRFM logic circuit with two comparators according to some embodiments of the present disclosure.

FIG. 6 is a schematic diagram of a DRFM logic circuit with two comparators according to some embodiments of the present disclosure. The DRFM logic circuit 600 of FIG. 6 may, in some embodiments, implement the DRFM logic circuit 260 of FIG. 2 and/or 300 of FIG. 3. In particular, the DRFM logic circuit 600 of FIG. 6 represents an example embodiment where there are two address management circuits each of which compares a received DRFM aggressor address to a first or a second previous DRFM aggressor address respectively.

The DRFM logic circuit 600 includes a DRFM control circuit 630 (e.g., 308 of FIG. 3) and two comparator circuits 610 and 620 (e.g., comparator circuits 304 in a first and second address management circuit such as 310 of FIG. 3). Latches, such as the latches 302 and 306 of FIG. 3 are not shown. However, the DRFM logic circuit 600 may include three latches, one to store the current sampled DRFM address DRFM_ADDR_SAMP, one to store a first previous DRFM address DRFM_ADDR_Flush and one to store a second previous DRFM address DRFM_ADDR_Flush2nd.

Each comparator circuit 610 and 620 may be similar in operation except for the signals they receive. Both comparators 610 and 620 receive a system power such as VPERI, as well as the DRFM aggressor address DRFM_ADDR_SAMP (and its opposite DRFM_ADDRF_SAMP, which has all of the bits inverted) as well as a control signal tmfzDRFMSkipCtrl which determines if the DRFM skip logic is enabled or not, a block enable signal BlockEn which determines if the operation of the comparators is blocked or not, a compare enabled signal CompareEn which causes the comparators to perform their compare function, and a DRFM signal DrfmrisePulse, which determines if a DRFM operation is being performed. The first comparator 610 receives a first previous address DRFM_ADDR_Flush (and its opposite) and a first reset signal rst3, and the second comparator 620 receives a second previous address DRFM_ADDR_Flus2nd (and its opposite) and a second reset signal rst4.

The comparator circuits may be operational when tmfzDRFMSkipCtrl is active (e.g., the DRFM skip feature is enabled in settings such as a fuse array and/or mode register of the memory) and the signal CompareEn is active while the signal BlockEn is inactive. When operation (e.g., CompareEn is active), the first comparator 610 provides a first match signal Match if the address DRFM_ADDR_Flush matches DRFM_ADDR_SAMP. When in operation (e.g., CompareEn is active), the second comparator 620 provides a second match signal Match2nd if the address DRFM_ADDR_Flush2nd matches DRFM_ADDR_SAMP.

The control circuit 630 receives a number of input signals such as fnCbrCntRstBuf, DRFM, DRFM_FLAG_OUT, and tmfzDRFMSkipCtrl which indicate that the device is active and in a DRFM mode where skipping DRFM operations is enabled. The control circuit 630 receives a DRFM sample signal ArmSampleD which indicates when a new DRFM address is being sampled. The control circuit 630 also receives the two match signals Match and Match2nd output from the two comparators 610 and 620.

The control circuit 630 provides the reset signals rst3 and rst4, as well as a signal that resets both comparators rst_tot. The control circuit 630 provides the block enable BlockEn and compare enable signals CompareEn. The control circuit 630 also provides DRFM control signals DrfmallPulse, DrfmrisePulse, DrfmfallPulse, and DrfmfallPusleDD. The control circuit also provides a skip signal SameAddrDrfm.

During an example operation, the signal ArmSampleD indicates that a new DRFM aggressor address has been sampled as DRFM_ADDR_SAMP. The control circuit 630 provides the signal CompareEn to cause the two comparators 610 and 620 to compare the address DRFM_ADDR_SAMP to their respective previous DRFM addresses. The control circuit 630 receives the signals Match and Match2nd, which indicate if either of the two comparators 610 and 620 found a match. If there is no match, the control circuit 630 provides DRFM signals such as DRFMallPulse to indicate that a DRFM flush operation should be performed. If there is not a match, then a reset signal such as rst3 or rst4 may be sent to indicate that one of the comparators 610 or 620 should be reset with a new previous address, and the current address DRFM_ADDR_SAMP may be saved as either DRFM_ADDR_Flush or DRFM_ADDR_Flush2nd. For example, the control circuit 630 may track which of the stored previous addresses is older and replace the older address first.

If there is a match and either Match or Match2nd is active, then the control circuit 630 may provide the skip signal SameAddrDrfm.

Figure 7:
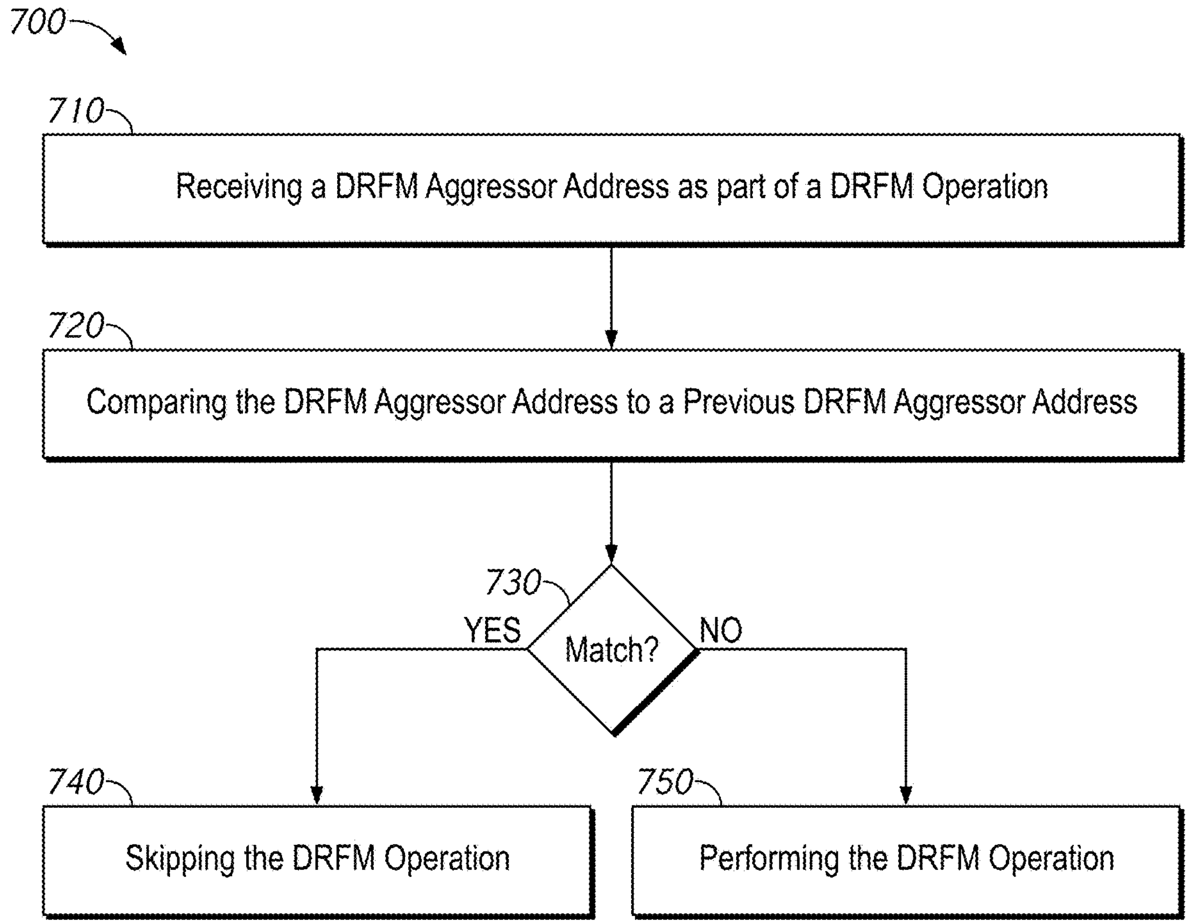
FIG. 7 is a flow chart of a method of determining whether to skip DRFM operations according to some embodiments of the present disclosure.

FIG. 7 is a flow chart of a method of determining whether to skip DRFM operations according to some embodiments of the present disclosure. The method 700 may, in some embodiments, be implemented by one or more of the apparatuses or systems described herein. For example, the method 700 may be performed by the memory device 100 of FIG. 1, 200 of FIG. 2, the DRFM logic circuit 300 of FIG. 3 and/or 600 of FIG. 6.

The method 700 may begin with block 710, which describes receiving a DRFM aggressor address as part of a DRFM operation. The method 700 may include receiving the DRFM aggressor address from a controller of a memory, and receiving the DRFM aggressor address at the memory. For example, the method may include the controller providing the address along an address bus and, and latching the address off the address bus as the DRFM aggressor address responsive to a DRFM sampling command. The method may include receiving the DRFM sampling command from the controller or generating the DRFM sampling command responsive to a DRFM command from the controller.

Block 710 may be followed by block 720, which describes comparing the DRFM aggressor address to a previous DRFM aggressor address. For example, a comparator (e.g., 304 of FIG. 3 and/or 610/620 of FIG. 6) may do the comparing. The DRFM aggressor address may be stored in a first latch (e.g., 302 of FIG. 3) while the previous DRFM aggressor address may be stored in a second latch (e.g., 306 of FIG. 3). Block 720 is followed by block 730, which describes determining if there's a match between the DRFM aggressor address and a previous DRFM aggressor address. If there is a match, the method proceeds to block 740. If there is not a match, the method 700 proceeds to block 750.

Block 740 describes skipping the DRFM operation if the addresses match. For example the method may include providing a DRFM skip signal, and skipping the DRFM operation responsive to the DRFM skip signal. In some embodiments, the method may include counting a number of times the DRFM operation is skipped and performing the DRFM operation (e.g., box 750) when the count value reaches a threshold even if the addresses match. For example, the method may include performing 1 out of every N DRFM operations while the addresses match. In some embodiments, the method 700 may include tracking aggressor addresses (e.g., in an aggressor queue such as 244 of FIG. 2) and performing a targeted refresh operation on an aggressor address from the queue instead of the skipped DRFM operation.

Block 750 describes performing a DRFM operation if the addresses do not match. Performing the DRFM operation may include generating one or more refresh addresses based on the DRFM aggressor address and performing refresh operations on word lines associated with the refresh addresses. The method 700 may include receiving a DRFM flush signal (e.g., from a controller), or generating a DRFM flush signal (e.g., based on a DRFM command from the controller) and performing the DRFM operation responsive to the DRFM flush command (e.g., when the DRFM skip signal is inactive).

In some embodiments, the method 700 may include determining whether or not to skip the DRFM operation on a victim address calculation-by-victim address calculation basis. For example, the method 700 may include determining that the DRFM aggressor address matches the previous DRFM aggressor address and performing some DRFM operations while skipping other DRFM operations. For example, the method 700 may include refreshing victims which are closer to the word line associated with the DRFM aggressor address while skipping victims which are further away from the DRFM aggressor address. For example, if the box 750 normally involves performing DRFM operations on a first number of refresh addresses, then the box 740 may involve performing DRFM operations on a second number of refresh addresses smaller than the first number.

It is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:

a direct refresh management (DRFM) logic circuit configured to latch a row address as a DRFM aggressor address responsive to receiving a sampling command, wherein the DRFM logic circuit is configured to provide an active skip signal if the DRFM aggressor address matches a previous DRFM aggressor address; and a refresh state control circuit configured to perform a DRFM operation by performing a targeted refresh operation based on the DRFM aggressor address responsive to a DRFM flush command when the skip signal is inactive, or to skip performing the DRFM operation if the skip signal is active.

2. The apparatus of claim 1, wherein the DRFM logic circuit is configured to compare the DRFM aggressor address to a first previous DRFM aggressor address and a second previous DRFM aggressor address, and configured to provide the active skip signal if the DRFM aggressor address matches the first previous DRFM aggressor address or the second previous DRFM aggressor address.

3. The apparatus of claim 1, wherein the DRFM logic circuit is configured to store the DRFM aggressor address as the previous DRFM aggressor address responsive to performing the targeted refresh operation based on the DRFM aggressor address.

4. The apparatus of claim 1, further comprising:

an aggressor detector circuit configured to identify an address as an aggressor address;

an aggressor queue configured to store the identified aggressor address, wherein the refresh state control circuit is configured to perform a targeted refresh operation based on the identified aggressor address in the aggressor queue responsive to a refresh management (RFM) signal.

5. The apparatus of claim 4, wherein the refresh state control circuit is configured to perform a targeted refresh operation based on the identified aggressor address in the aggressor queue responsive to skipping performing the DRFM operation.

6. The apparatus of claim 1, wherein the DRFM logic circuit comprises:

a first latch configured to store the DRFM aggressor address;

a second latch configured to store the previous DRFM aggressor address; and a comparator circuit configured to compare the DRFM aggressor address in the first latch to the previous DRFM aggressor address in the second latch and provide a match signal if the DRFM aggressor address matches the previous DRFM aggressor address, wherein the active skip signal is provided based, in part, on the match signal.

7. The apparatus of claim 6, further comprising a DRFM control circuit configured to change a count value responsive to the match signal and to provide the active skip signal based on the changed count value.

8. An apparatus comprising:

a first latch circuit configured to store a row address as a direct refresh management (DRFM) aggressor address responsive to a sampling signal;

a second latch circuit configured to store a previous DRFM aggressor address;

a comparator circuit configured to provide a match signal if the DRFM aggressor address matches the previous DRFM aggressor address; and a DRFM control circuit configured to provide a DRFM skip signal based, in part, on the match signal, wherein a DRFM operation is skipped based, in part, on the DRFM skip signal.

9. The apparatus of claim 8, further comprising a refresh state control circuit configured to perform a DRFM operation responsive to a DRFM flush command when the DRFM skip signal is not provide and configured to skip performing the DRFM operation responsive to the DRFM flush command when the DRFM skip signal is provided.

10. The apparatus of claim 9, further comprising:

a refresh address generator configured to generate a refresh address based on the DRFM aggressor address responsive to the refresh state control circuit performing the DRFM operation; and a row decoder configured to refresh one or more word lines based on the refresh address.

11. The apparatus of claim 10, further comprising an aggressor queue configured to store an aggressor address, wherein the refresh state control circuit is configured to perform a targeted refresh operation responsive to skipping the DRFM operation, and wherein the refresh address generator is configured to generate the refresh address based on the aggressor address in the aggressor queue responsive to the targeted refresh operation.

12. The apparatus of claim 8, wherein the DRFM control circuit is configured to change a count value responsive to the match signal, and configured to not provide the DRFM skip signal and reset the count value responsive to the count value reaching a threshold value.

13. The apparatus of claim 8, further comprising:

a third latch circuit configured to store a second previous DRFM address; and a second comparator circuit configured to provide a second match signal if the DRFM aggressor address matches the second previous DRFM address, wherein the DRFM control circuit is configured to provide the DRFM skip signal based, in part, on the match signal and the second match signal.

14. The apparatus of claim 8, wherein the DRFM control circuit is configured to store the DRFM aggressor address from the first latch as the previous DRFM aggressor address in the second latch responsive to a DRFM flush signal when the DRFM skip signal is not provided.

15. A method comprising:

receiving a direct refresh management (DRFM) aggressor address as part of a DRFM operation;

comparing the DRFM aggressor address to a previous DRFM aggressor address; and skipping the DRFM operation if the DRFM address matches the previous DRFM address.

16. The method of claim 15, further comprising refreshing one or more word lines based on the DRFM aggressor address as part of the DRFM operation if the DRFM operation is not skipped.

17. The method of claim 15, further comprising:

counting a number of times the DRFM operation is skipped; and performing the DRFM operation when the count reaches a threshold even if the DRFM address matches the previous DRFM address.

18. The method of claim 15, further comprising storing the DRFM aggressor address in a latch as the previous DRFM aggressor if the DRFM operation is not skipped.

19. The method of claim 15, further comprising:

comparing the DRFM aggressor address to a second previous DRFM aggressor address; and skipping the DRFM operation if the DRFM address matches the first or the second previous DRFM aggressor address.

20. The method of claim 15, further comprising:

identifying an aggressor address and storing the identified aggressor address in an aggressor queue; and performing a targeted refresh operation on the aggressor address from the aggressor queue responsive to skipping the DRFM operation.

* * * * *